United States Patent
Horstmeyer et al.

(10) Patent No.: US 10,665,001 B2
(45) Date of Patent: May 26, 2020

(54) FOURIER PTYCHOGRAPHIC TOMOGRAPHY

(71) Applicant: California Institute of Technology, Pasadena, CA (US)

(72) Inventors: Roarke W. Horstmeyer, San Marino, CA (US); Changhuei Yang, Alhambra, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 15/003,559

(22) Filed: Jan. 21, 2016

(65) Prior Publication Data
US 2016/0210763 A1 Jul. 21, 2016

Related U.S. Application Data

(60) Provisional application No. 62/106,133, filed on Jan. 21, 2015.

(51) Int. Cl.
| | |
|---|---|
| G06K 9/36 | (2006.01) |
| G02B 27/58 | (2006.01) |
| G06T 11/00 | (2006.01) |
| G02B 21/36 | (2006.01) |
| G01B 1/00 | (2006.01) |

(52) U.S. Cl.
CPC .......... G06T 11/006 (2013.01); G02B 21/365 (2013.01); G02B 21/367 (2013.01); G02B 27/58 (2013.01)

(58) Field of Classification Search
CPC .. A61B 1/00039; A61B 5/0066; G02B 21/06; G02B 21/367; G02B 27/58; H04N 7/18; G06K 9/00

USPC ........ 348/79, 77, 80; 356/491, 479; 382/128
See application file for complete search history.

(56) References Cited

U.S. PATENT DOCUMENTS

| | | | |
|---|---|---|---|
| 5,475,527 | A | 12/1995 | Hackel et al. |
| 6,144,365 | A | 11/2000 | Young et al. |
| 6,154,196 | A | 11/2000 | Fleck et al. |
| 6,320,174 | B1 | 11/2001 | Tafas et al. |
| 6,320,648 | B1 | 11/2001 | Brueck et al. |

(Continued)

FOREIGN PATENT DOCUMENTS

| | | |
|---|---|---|
| CN | 1688254 A | 10/2005 |
| CN | 1932565 A | 3/2007 |

(Continued)

OTHER PUBLICATIONS

Tian, "Multiplexed coded illumination for Fourier Ptychography with an LED arrary microscope", Jul. 1, 2014.*

(Continued)

*Primary Examiner* — Albert Kir
(74) *Attorney, Agent, or Firm* — Sheila Martinez-Lemke; Weaver Austin Villeneuve & Sampson LLP

(57) ABSTRACT

Certain aspects pertain to Fourier ptychographic tomographic systems and methods for acquiring a plurality of uniquely illuminated intensity measurements based on light passing through a thick sample from plane wave illumination at different angles and for constructing three-dimensional tomographic data of the thick sample by iteratively determining three-dimensional tomographic data in the Fourier domain that is self-consistent with the uniquely illuminated intensity measurements.

19 Claims, 14 Drawing Sheets

(56) References Cited

U.S. PATENT DOCUMENTS

| | | |
|---|---|---|
| 6,747,781 B2 | 6/2004 | Trisnadi |
| 6,759,949 B2 | 7/2004 | Miyahara |
| 6,905,838 B1 | 6/2005 | Bittner |
| 7,436,503 B1 | 10/2008 | Chen et al. |
| 7,460,248 B2 | 12/2008 | Kurtz et al. |
| 7,706,419 B2 | 4/2010 | Wang et al. |
| 7,738,095 B2 | 6/2010 | Gardner, Jr. et al. |
| 7,787,588 B1 | 8/2010 | Yun et al. |
| 8,271,251 B2 | 9/2012 | Schwartz et al. |
| 8,313,031 B2 | 11/2012 | Vinogradov |
| 8,497,934 B2 | 7/2013 | Milnes et al. |
| 8,624,968 B1 | 1/2014 | Zheng et al. |
| 8,654,201 B2 | 2/2014 | Lim et al. |
| 8,942,449 B2 | 1/2015 | Maiden |
| 9,029,745 B2 | 5/2015 | Maiden |
| 9,426,455 B2 | 8/2016 | Horstmeyer et al. |
| 9,497,379 B2 | 11/2016 | Ou et al. |
| 9,829,695 B2 | 11/2017 | Kim et al. |
| 9,864,184 B2 | 1/2018 | Ou et al. |
| 9,892,812 B2 | 2/2018 | Zheng et al. |
| 9,983,397 B2 | 5/2018 | Horstmeyer et al. |
| 9,993,149 B2 | 6/2018 | Chung et al. |
| 9,998,658 B2 | 6/2018 | Ou et al. |
| 10,162,161 B2 | 12/2018 | Horstmeyer et al. |
| 10,168,525 B2 | 1/2019 | Kim et al. |
| 10,222,605 B2 | 3/2019 | Kim et al. |
| 10,228,550 B2 | 3/2019 | Ou et al. |
| 10,401,609 B2 | 9/2019 | Ou et al. |
| 10,419,665 B2 | 9/2019 | Ou et al. |
| 10,568,507 B1 | 2/2020 | Chung et al. |
| 2001/0055062 A1* | 12/2001 | Shioda ............... A61B 1/00039 348/79 |
| 2002/0141051 A1 | 10/2002 | Vogt et al. |
| 2003/0116436 A1 | 6/2003 | Amirkhanian et al. |
| 2003/0118223 A1 | 6/2003 | Rahn et al. |
| 2004/0057094 A1 | 3/2004 | Olszak et al. |
| 2004/0146196 A1 | 7/2004 | Van Heel |
| 2004/0190762 A1 | 9/2004 | Dowski, Jr. et al. |
| 2005/0211912 A1 | 9/2005 | Fox |
| 2006/0098293 A1 | 5/2006 | Garoutte et al. |
| 2006/0158754 A1 | 7/2006 | Tsukagoshi et al. |
| 2006/0173313 A1 | 8/2006 | Liu et al. |
| 2006/0291707 A1 | 12/2006 | Kothapalli et al. |
| 2007/0057184 A1 | 3/2007 | Uto et al. |
| 2007/0133113 A1 | 6/2007 | Minabe et al. |
| 2007/0159639 A1 | 7/2007 | Teramura et al. |
| 2007/0171430 A1 | 7/2007 | Tearney et al. |
| 2007/0189436 A1 | 8/2007 | Goto et al. |
| 2007/0206200 A1 | 9/2007 | Lindner et al. |
| 2007/0269826 A1 | 11/2007 | Geddes |
| 2008/0101664 A1 | 5/2008 | Perez |
| 2008/0182336 A1 | 7/2008 | Zhuang et al. |
| 2009/0046164 A1 | 2/2009 | Shroff et al. |
| 2009/0079987 A1 | 3/2009 | Ben-Ezra et al. |
| 2009/0125242 A1 | 5/2009 | Choi et al. |
| 2009/0284831 A1 | 11/2009 | Schuster et al. |
| 2009/0316141 A1 | 12/2009 | Feldkhun |
| 2010/0135547 A1 | 6/2010 | Lee et al. |
| 2010/0271705 A1 | 10/2010 | Hung |
| 2011/0075928 A1 | 3/2011 | Jeong et al. |
| 2011/0181869 A1 | 7/2011 | Yamaguchi et al. |
| 2011/0192976 A1 | 8/2011 | Own et al. |
| 2011/0235863 A1 | 9/2011 | Maiden |
| 2011/0255163 A1 | 10/2011 | Merrill et al. |
| 2012/0069344 A1 | 3/2012 | Liu |
| 2012/0099803 A1 | 4/2012 | Ozcan et al. |
| 2012/0105618 A1 | 5/2012 | Brueck et al. |
| 2012/0118967 A1 | 5/2012 | Gerst |
| 2012/0157160 A1 | 6/2012 | Ozcan et al. |
| 2012/0176673 A1 | 7/2012 | Cooper |
| 2012/0182541 A1 | 7/2012 | Canham |
| 2012/0218379 A1 | 8/2012 | Ozcan et al. |
| 2012/0248292 A1 | 10/2012 | Ozcan et al. |
| 2012/0250032 A1 | 10/2012 | Wilde et al. |
| 2012/0281929 A1 | 11/2012 | Brand et al. |
| 2013/0057748 A1 | 3/2013 | Duparre et al. |
| 2013/0083886 A1 | 4/2013 | Carmi et al. |
| 2013/0093871 A1 | 4/2013 | Nowatzyk et al. |
| 2013/0094077 A1 | 4/2013 | Brueck et al. |
| 2013/0100525 A1 | 4/2013 | Chiang et al. |
| 2013/0170767 A1 | 7/2013 | Choudhury et al. |
| 2013/0182096 A1 | 7/2013 | Boccara et al. |
| 2013/0223685 A1 | 8/2013 | Maiden |
| 2014/0007307 A1 | 1/2014 | Routh, Jr. et al. |
| 2014/0029824 A1 | 1/2014 | Shi et al. |
| 2014/0043616 A1 | 2/2014 | Maiden et al. |
| 2014/0050382 A1 | 2/2014 | Adie et al. |
| 2014/0085629 A1 | 3/2014 | Bodkin et al. |
| 2014/0118529 A1 | 5/2014 | Zheng et al. |
| 2014/0126691 A1 | 5/2014 | Zheng et al. |
| 2014/0133702 A1 | 5/2014 | Zheng et al. |
| 2014/0152801 A1 | 6/2014 | Fine et al. |
| 2014/0153692 A1 | 6/2014 | Larkin et al. |
| 2014/0160236 A1 | 6/2014 | Ozcan et al. |
| 2014/0160488 A1* | 6/2014 | Zhou ............... G01B 9/02004 356/479 |
| 2014/0217268 A1 | 8/2014 | Schleipen et al. |
| 2014/0267674 A1 | 9/2014 | Mertz et al. |
| 2014/0347672 A1* | 11/2014 | Pavillon ............... A61B 5/0066 356/491 |
| 2014/0368812 A1 | 12/2014 | Humphry et al. |
| 2015/0036038 A1 | 2/2015 | Horstmeyer et al. |
| 2015/0044098 A1 | 2/2015 | Smart et al. |
| 2015/0054979 A1 | 2/2015 | Ou et al. |
| 2015/0160450 A1 | 6/2015 | Ou et al. |
| 2015/0264250 A1 | 9/2015 | Ou et al. |
| 2015/0286042 A1 | 10/2015 | Hilbert et al. |
| 2015/0331228 A1 | 11/2015 | Horstmeyer et al. |
| 2016/0088205 A1 | 3/2016 | Horstmeyer et al. |
| 2016/0110584 A1 | 4/2016 | Remiszewski et al. |
| 2016/0156880 A1 | 6/2016 | Teich et al. |
| 2016/0178883 A1 | 6/2016 | Horstmeyer et al. |
| 2016/0202460 A1 | 7/2016 | Zheng |
| 2016/0216208 A1 | 7/2016 | Kim et al. |
| 2016/0216503 A1 | 7/2016 | Kim et al. |
| 2016/0266366 A1 | 9/2016 | Chung et al. |
| 2016/0320595 A1 | 11/2016 | Horstmeyer et al. |
| 2016/0320605 A1 | 11/2016 | Ou et al. |
| 2016/0341945 A1 | 11/2016 | Ou et al. |
| 2017/0061599 A1 | 3/2017 | Remiszewski et al. |
| 2017/0146788 A1 | 5/2017 | Waller et al. |
| 2017/0178317 A1 | 6/2017 | Besley et al. |
| 2017/0188853 A1 | 7/2017 | Nakao et al. |
| 2017/0273551 A1 | 9/2017 | Chung et al. |
| 2017/0299854 A1 | 10/2017 | Kim et al. |
| 2017/0354329 A1 | 12/2017 | Chung et al. |
| 2017/0363853 A1 | 12/2017 | Besley |
| 2017/0371141 A1 | 12/2017 | Besley |
| 2018/0045569 A1 | 2/2018 | Nath et al. |
| 2018/0048811 A1 | 2/2018 | Waller et al. |
| 2018/0078447 A1 | 3/2018 | Viner et al. |
| 2018/0078448 A9 | 3/2018 | Shockley, Jr. et al. |
| 2018/0088309 A1 | 3/2018 | Ou et al. |
| 2018/0120553 A1 | 5/2018 | Leshem et al. |
| 2018/0231761 A1 | 8/2018 | Dai et al. |
| 2018/0307017 A1 | 10/2018 | Horstmeyer et al. |
| 2018/0316855 A1 | 11/2018 | Ou et al. |
| 2018/0329194 A1 | 11/2018 | Small et al. |
| 2018/0348500 A1 | 12/2018 | Naaman, III et al. |
| 2018/0373016 A1 | 12/2018 | Leshem et al. |
| 2019/0049712 A1 | 2/2019 | Kim et al. |
| 2019/0056578 A1 | 2/2019 | Horstmeyer et al. |
| 2019/0077610 A1 | 3/2019 | Flammann |
| 2019/0097523 A1 | 3/2019 | Schaefer |
| 2019/0097524 A1 | 3/2019 | Lin |
| 2019/0137753 A1 | 5/2019 | Chan et al. |
| 2019/0317311 A1 | 10/2019 | Kim et al. |
| 2019/0331902 A1 | 10/2019 | Ou et al. |
| 2019/0391382 A1 | 12/2019 | Chung et al. |

FOREIGN PATENT DOCUMENTS

| | | |
|---|---|---|
| CN | 1311392 C | 4/2007 |
| CN | 101408623 A | 4/2009 |

(56) References Cited

FOREIGN PATENT DOCUMENTS

| | | | |
|---|---|---|---|
| CN | 101680848 A | 3/2010 | |
| CN | 101743519 A | 6/2010 | |
| CN | 101868740 A | 10/2010 | |
| CN | 101872033 A | 10/2010 | |
| CN | 101957183 A | 1/2011 | |
| CN | 102608597 A | 7/2012 | |
| CN | 102753935 A | 10/2012 | |
| CN | 103096804 A | 5/2013 | |
| CN | 103154662 A | 6/2013 | |
| CN | 103201648 A | 7/2013 | |
| CN | 103377746 A | 10/2013 | |
| CN | 104181686 A | 12/2014 | |
| CN | 104200449 A | 12/2014 | |
| JP | 2007-299604 A | 11/2007 | |
| JP | 2008-147629 A | 6/2008 | |
| JP | 2010-012222 A | 1/2010 | |
| KR | 10-1998-0075050 A | 11/1998 | |
| TW | 201428339 A | 7/2014 | |
| WO | WO 99/53469 A1 | 10/1999 | |
| WO | WO 2002/102128 A1 | 12/2002 | |
| WO | WO 2003/062744 A1 | 7/2003 | |
| WO | WO 2008/116070 A1 | 9/2008 | |
| WO | WO 2011/093043 A1 | 8/2011 | |
| WO | WO 2012/037182 A1 | 3/2012 | |
| WO | WO 2014/070656 A1 | 5/2014 | |
| WO | WO 2015/017730 A1 | 2/2015 | |
| WO | WO 2015/027188 A1 | 2/2015 | |
| WO | WO 2016/090331 | 6/2016 | |
| WO | WO 2016/106379 A1 | 6/2016 | |
| WO | WO 2016/118761 A1 | 7/2016 | |
| WO | WO 2016/123156 A1 | 8/2016 | |
| WO | WO 2016/123157 A1 | 8/2016 | |
| WO | WO 2016/149120 A1 | 9/2016 | |
| WO | WO 2016/187591 A1 | 11/2016 | |
| WO | WO 2017/066198 A1 | 4/2017 | |
| WO | WO 2017081539 A1 | 5/2017 | |
| WO | WO 2017081540 A1 | 5/2017 | |
| WO | WO 2017081542 A2 | 5/2017 | |

OTHER PUBLICATIONS

Tian, "3D differential phase-contrast microscopy with computational illumination using an LED array", Mar. 1, 2014.*
Bunk, "Influence of the overlap parameter on the convergence of the ptychographical iterative engine", Aug. 1, 2007.*
Zheng, "Wide-field, high-resolution Fourier Ptychographic microscopy", 2013 (Year: 2013).*
U.S. Appl. No. 15/068,389, filed Mar. 11, 2016 entitled "Correcting for Aberrations in Incoherent Imaging Systems Using Fourier Ptychographic Techniques".
U.S. Appl. No. 15/081,659, filed Mar. 25, 2016 entitled "Fourier Ptychographic Retinal Imaging Methods and Systems".
U.S. Appl. No. 15/160,941, filed May 20, 2016 entitled "Laser-Based Fourier Ptychographic Imaging Systems and Methods".
U.S. Office Action dated Oct. 5, 2015 in U.S. Appl. No. 14/065,305.
U.S. Notice of Allowance dated Dec. 4, 2015 in U.S. Appl. No. 14/065,305.
U.S. Notice of Allowance dated Jan. 14, 2016 in U.S. Appl. No. 14/448,850.
U.S. Notice of Allowance dated Jan. 22, 2016 in U.S. Appl. No. 14/466,481.
U.S. Notice of Allowance dated Apr. 13, 2016 in U.S. Appl. No. 14/448,850.
U.S. Notice of Allowance dated Apr. 22, 2016 in U.S. Appl. No. 14/466,481.
U.S. Office Action dated Jul. 14, 2016 in U.S. Appl. No. 15/007,196.
International Search Report and Written Opinion dated Feb. 21, 2014 in PCT/US2013/067068.
International Preliminary Report on Patentability dated May 14, 2015 in PCT/US2013/067068.
European Third-Party Observations, dated Jan. 20, 2016 in EP Application No. 13851670.3.

European Extended Search Report dated Mar. 31, 2016 in EP Application No. 13851670.3.
International Preliminary Report on Patentability dated Mar. 3, 2016 issued in PCT/US2014/052351.
International Search Report and Written Opinion dated Dec. 5, 2014 issued in PCT/US2014/052351.
International Search Report and Written Opinion dated Nov. 13, 2014 issued in PCT/US2014/049297.
International Preliminary Report on Patentability dated Feb. 11, 2016 issued in PCT/US2014/049297.
International Search Report and Written Opinion dated Feb. 22, 2016 issued in PCT/US2015/064126.
International Search Report and Written Opinion dated Apr. 19, 2016 issued in PCT/US2015/067498.
International Search Report and Written Opinion dated May 4, 2016 issued in PCT/US2016/015001.
International Search Report and Written Opinion dated May 11, 2016 issued in PCT/US2016/015002.
International Search Report and Written Opinion dated Jun. 27, 2016 issued in PCT/US2016/022116.
International Search Report and Written Opinion dated Jun. 30, 2016 issued in PCT/US2016/014343.
"About Molemap," Retrieved Oct. 23, 2015, 2 pages. [http://molemap.net.au/about-us/].
Abramomwitz, M. et al, "Immersion Media," Olympus Microscopy Resource Center, 2012, 6 pp. [http://www.olympusmicro.com/primer/anatomy/immersion.html].
Abramomwitz, M., et al, "Field Curvature," Olympus Microscopy Resource Center, 2012, 3 pp. [http://www.olympusmicro.com/primer/anatomy/fieldcurvature.html].
"Age-Related Macular Degeneration (AMD) | National Eye Institute." [Online]. Available: https://www.nei.nih.gov/eyedata/amd#top. [Accessed: Apr. 5, 2016].
Alexandrov, S., et al, "Spatial information transmission beyond a system's diffraction limit using optical spectral encoding of the spatial frequency," Journal of Optics A: Pure and Applied Optics 10, 025304 (2008).
Alexandrov, S.A., et al, "Synthetic Aperture Fourier holographic optical microscopy," Phys. Rev. Lett. 97, 168102 (2006).
Arimoto, H., et al, "Integral three-dimensional imaging with digital reconstruction," Opt. Lett. 26, 157-159 (2001).
Balan, R., et al, "On signal reconstruction without phase, Applied and Computational Harmonic Analysis 20," No. 3 (2006): 345-356.
Balan, R., et al, "Painless reconstruction from magnitudes of frame coefficients," J Fourier Anal Appl 15:488-501 (2009).
Bauschke, H.H., et al, "Phase retrieval, error reduction algorithm, and Fienup variants: a view from convex optimization," J Opt Soc Am A 19:1334-1345 (2002).
Becker, S., et al, "Templates for convex cone problems with applications to sparse signal recovery," Technical report, Department of Statistics, Stanford University, (2010), 48 Pages.
Betti, R., et al, "Observational study on the mitotic rate and other prognostic factors in cutaneous primary melanoma arising from naevi and from melanoma de novo," Journal of the European Academy of Dermatology and Venereology, 2014.
Bian, L., et al, "Fourier ptychographic reconstruction using Wirtinger flow optimization," Opt. Express 23:4856-4866 (2015).
Bian, Z., et al, "Adaptive system correction for robust Fourier ptychographic imaging," Optics express, 2013. 21(26): p. 32400-32410.
BioTek® Brochure: BioTek's Multi-Mode Microplate Reading Techonologies, 2016, 2 pp. [http://www.biotek.com].
Bishara, W., et al, "Holographic pixel super-resolution in portable lensless on-chip microscopy using a fiber-optic array," Lab Chip 11(7), 1276-1279 (2011).
Bishara, W., et al, "Lensfree on-chip microscopy over a wide field-of-view using pixel super-resolution," Opt. Express 18(11), 11181-11191 (2010).
Blum, A., et al, "Clear differences in hand-held dermoscopes," JDDG: Journal der Deutschen Dermatologischen Gesellschaft, 2006, 4(12): p. 1054-1057.

(56) References Cited

OTHER PUBLICATIONS

Blum, A., et al, Dermatoskopie von Hauttumoren: Auflichtmikroskopie; Dermoskopie; digitale Bildanalyse; mit 28 Tabellen. 2003: Springer DE, Chapter 4 "Dermatoskopisch sichtbare Strukturen" p. 15-66.

Born, M., et al, "Principles of Optics: Electromagnetic theory of propagation, interference and diffraction of light" 7th Ed., Cambridge Univ. Press, (1999) pp. 1-31.

Brady, D., et al, "Multiscale gigapixel photography," Nature 486, 386-389 (2012).

Burer, S., et al, "A nonlinear programming algorithm for solving semidefinite programs via low-rank factorization," Math Program, Ser B 95:329-357 (2003).

Burer, S., et al, "Local minima and convergence in low-rank semidefinite programming. Math Program," Ser A 103:427-444 (2005).

Candes, E.J., et al, "Phase retrieval via matrix completion," SIAM J. Imaging Sci. 6:199-225 (2012).

Candes, E.J., et al, "Phase retrieval via Wirtinger flow: theory and algorithms," IEEE Trans. Info. Theory 61:1985-2007 (2015).

Candes, E.J., et al, "PhaseLift: exact and stable signal recovery from magnitude measurements via convex programming.," Comm Pure Appl Math 66:1241-1274 (2013).

Carroll, J., "Adaptive optics retinal imaging: applications for studying retinal degeneration," Arch. Ophthalmol., vol. 126, pp. 857-858, 2008.

Chao, W. et al, "Soft X-ray microscopy at a spatial resolution better than 15 nm," Nature Letters, vol. 435/30, (Jun. 2005) pp. 1210-1213.

Chen, T., et al, "Polarization and phase shifting for 3D scanning of translucent objects," Proc. CVPR, (2007).

Chin, L., et al, "Malignant melanoma: genetics and therapeutics in the genomic era," Genes & development, 2006, 20(16): p. 2149-2182.

Choi, W., et al, "Tomographic phase microscopy," Nature Methods 4(9) (2007), pp. 1-3 Published Online Aug. 12, 2007.

Chung, J., et al, "Counting White Blood Cells from a Blood Smear Using Fourier Ptychographic Microscopy," PLoS One 10(7), e0133489 (2015).

Chung, J., et al, "Wide field-of-view fluorescence image deconvolution with aberration-estimation from Fourier ptychography," Feb. 1, 2016, vol. 7, No. 2, Biomedical Optics Express 352.

Colomb, T., et al, "Automatic procedure for aberration compensation in digital holographic microscopy and applications to specimen shape compensation," Appl. Opt. 45, 851-863 (2006).

De Sa, C., et al, "Global convergence of stochastic gradient descent for some non convex matrix problems," Proc. 32nd Int. Conf. Machine Learning (2015), 10 pp.

Debailleul, M., et al, "High-resolution three-dimensional tomographic diffractive microscopy of transparent inorganic and biological samples," Optic Letters 34 (2008).

Denis, L., et al, "Inline hologram reconstruction with sparsity constraints," Opt. Lett. 34, pp. 3475-3477 (2009).

Di, J., et al, "High resolution digital holographic microscopy with a wide field of view based on a synthetic aperture technique and use of linear CCD scanning," Appl. Opt. 47, pp. 5654-5659 (2008).

Dierolf, M., et al, "Ptychographic coherent diffractive imaging of weakly scattering specimens," New J. Phys. 12, 035017 (2010).

Dierolf, M., et al, "Ptychographic X-ray computed tomography at the nanoscale," Nature, vol. 467, pp. 436-439, (2010).

"Doctor Mole—Skin Cancer App," Retrieved Oct. 23, 2015, 1 page. [http://www.doctormole.com].

Dong, S., et al, "FPscope: a field-portable high-resolution microscope using a cellphone lens," Biomed. Opt. Express 5(10), 3305-3310 (2014).

Dong, S., et al, "High-resolution fluorescence imaging via pattern-illuminated Fourier ptychography," Opt. Express 22(17), 20856-20870 (2014).

Dong, S., et al, "Aperture-scanning Fourier ptychography for 3D refocusing and super-resolution macroscopic imaging," pp. 13586-13599 (Jun. 2, 2014).

Eldar, Y.C., et al, "Sparse phase retrieval from short-time Fourier measurements," IEEE Signal Processing Letters 22, No. 5 (2015): 638-642.

Emile, O., et al, "Rotating polarization imaging in turbid media," Optics Letters 21(20), (1996).

Faulkner, H.M.L., and Rodenburg, J.M., "Error tolerance of an iterative phase retrieval algorithm for moveable illumination microscopy," Ultramicroscopy 103(2), 153-164 (2005).

Faulkner, H.M.L., and Rodenburg, J.M., "Movable aperture lensless transmission microscopy: a novel phase retrieval algorithm," Phys. Rev. Lett. 93, 023903 (2004).

Fazel, M., "Matrix rank minimization with applications," PhD Thesis (Stanford University, Palo Alto, CA). (2002).

Feng, P., et al, "Long-working-distance synthetic aperture Fresnel off-axis digital holography," Optics Express 17, pp. 5473-5480 (2009).

Fienup, J. R., "Invariant error metrics for image reconstruction," Appl. Opt. 36(32), 8352-8357 (1997).

Fienup, J. R., "Lensless coherent imaging by phase retrieval with an illumination pattern constraint," Opt. Express 14, 498-508 (2006).

Fienup, J. R., "Phase retrieval algorithms: a comparison," Appl. Opt. 21, 2758-2769 (1982).

Fienup, J. R., "Reconstruction of a complex-valued object from the modulus of its Fourier transform using a support constraint," J. Opt. Soc. Am. A 4, 118-123 (1987).

Fienup, J. R., "Reconstruction of an object from the modulus of its Fourier transform," Opt. Lett. 3, 27-29 (1978).

Gan, X., et al, "Image enhancement through turbid media under a microscope by use of polarization gating methods," JOSA A 16(9), (1999).

Gerke T.D., et al, "Aperiodic volume optics," Nature Photonics (2010), vol. 4, pp. 188-193.

Ghosh, A., et al,"Multiview face capture using polarized spherical gradient illumination," ACM Transactions on Graphics 30(6) (2011).

Godara, P., et al, "Adaptive optics retinal imaging: emerging clinical applications.," Optom. Vis. Sci., vol. 87, No. 12, pp. 930-941, Dec. 2010.

Goodman, J.W. "Introduction to Fourier Optics," Roberts & Company Publication, Third Edition, chapters 1-6, pp. 1-172 (2005).

Goodson, A.G., et al, "Comparative analysis of total body and dermatoscopic photographic monitoring of nevi in similar patient populations at risk for cutaneous melanoma," Dermatologic Surgery, 2010. 36(7): p. 1087-1098.

Granero, L., et al, "Synthetic aperture superresolved microscopy in digital lensless Fourier holography by time and angular multiplexing of the object information," Appl. Opt. 49, pp. 845-857 (2010).

Grant, M., et al, "CVX: Matlab software for disciplined convex programming," version 2.0 beta. http://cvxr.com/cvx, (Sep. 2013), 3 pages.

Greenbaum, A., et al, "Field-portable wide-field microscopy of dense samples using multi-height pixel super resolution based lensfree imaging," Lab Chip 12(7), 1242-1245 (2012).

Greenbaum, A., et al, "Increased space-bandwidth product in pixel super-resolved lensfree on-chip microscopy," Sci. Rep. 3, p. 1717 (2013).

Gruev, V., et al, "Dual-tier thin film polymer polarization imaging sensor," Optics Express, vol. 18, No. 18, 12 pages (2010).

Guizar-Sicairos, M., and Fienup, J.R.,"Phase retrieval with transverse translation diversity: a nonlinear optimization approach," Opt. Express 16, 7264-7278 (2008).

Gunturk, B.K., et al, "Image Restoration: Fundamentals and Advances," vol. 7, Chapter 3, pp. 63-68 (CRC Press, 2012).

Gustafsson, M.G.L., "Surpassing the lateral resolution limit by a factor of two using structured illumination microscopy," J. Microsc. 198, 82-87 (2000).

Gutzler, T., et al, "Coherent aperture-synthesis, wide-field, high-resolution holographic microscopy of biological tissue," Opt. Lett. 35, pp. 1136-1138 (2010).

Haigh, S. J., et al, (2009) "Atomic structure imaging beyond conventional resolution limits in the transmission electron microscope"; Physical Review Letters 103. 126101-1 126101-4.

(56) References Cited

OTHER PUBLICATIONS

Han, C., et al, "Wide Field-of-View On-Chip Talbot Fluorescence Microscopy for Longitudinal Cell Culture Monitoring from within the Incubator" Anal. Chem. 85(4), 2356-2360 (2013).
Hillman, T.R., et al, "High-resolution, wide-field object reconstruction with synthetic aperture Fourier holographic optical microscopy," Opt. Express 17, pp. 7873-7892 (2009).
Hofer, H., et al, "Dynamics of the eye's wave aberration," J. Opt. Soc. Am. A, vol. 18, No. 3, p. 497, 2001.
Hofer, H., et al, "Organization of the human trichromatic cone mosaic.," J. Neurosci., vol. 25, No. 42, pp. 9669-9679, Oct. 2005.
Hong, S-H., et al, "Three-dimensional volumetric object reconstruction using computational integral imaging," Opt. Express 12, 483-491 (2004).
Hoppe, W., "Diffraction in inhomogeneous primary wave fields. 1. Principle of phase determination from electron diffraction interference," Acta Crystallogr. A25, 495-501 1969.
Horstmeyer, R., et al, "A phase space model of Fourier ptychographic microscopy," Optics Express, 2014. 22(1): p. 338-358.
Horstmeyer, R., et al, "Digital pathology with fourier ptychography," Comput. Med. Imaging Graphics 42, 38-43 (2015).
Horstmeyer, R., et al, "Overlapped fourier coding for optical aberration removal," Manuscript in preparation, 19 pages (2014).
Horstmeyer, R., et al, "Solving ptychography with a convex relaxation," Physics Optics (2014) 1-8 pages.
Hüe, F., et al, "Wave-front phase retrieval in transmission electron microscopy via ptychography," Phys. Rev. B 82, 121415 (2010).
Humphry, M., et al, "Ptychographic electron microscopy using high-angle dark-field scattering for sub-nanometre resolution imaging," Nat. Commun. 3, 730 (2012).
IncuCyte® ZOOM System, Brochure, 1-4 pp. (2016) (retrieved Feb. 25, 2016), [http://www.essenbioscience.com/media/uploads/files/8000-0333-E00-IncuCyte ZOOM brochure.pdf].
Jaganathan, K., et al, "Recovery of sparse 1-D signals from the magnitudes of their Fourier transform," IEEE International Symposium on Information Theory Proceedings (2012): 1473-1477.
Jaganathan, K., et al, "Phase retrieval with masks using convex optimization," IEEE International Symposium on Information Theory Proceedings (2015): 1655-1659.
Jaganathan, K., et al, "STFT Phase retrieval: uniqueness guarantees and recovery algorithms," arXiv preprint arXiv:1508.02820 (2015).
Joeres, S., et al, "Retinal imaging with adaptive optics scanning laser ophthalmoscopy in unexplained central ring scotoma.," Arch. Ophthalmol., vol. 126, No. 4, pp. 543-547, Apr. 2008.
Jung, J.H., et al, "Microfluidic-integrated laser-controlled microactuators with on-chip microscopy imaging functionality," Lab Chip 14 (19), Oct. 7, 2014, pp. 3781-3789.
Kay, D. B., et al, "Outer retinal structure in best vitelliform macular dystrophy.," JAMA Ophthalmol., vol. 131, pp. 1207-1215, 2013.
Kim, J., et al, Incubator embedded cell culture imaging system (EmSight) based on Fourier ptychographic microscopy. EmSight manuscript, Optical Society of America, 2015.
Kim, M., et al, "High-speed synthetic aperture microscopy for live cell imaging," Opt. Lett. 36, pp. 148-150 (2011).
Kirkland, A.I., et al, "Multiple beam tilt microscopy for super resolved imaging;" Japanese Society of Electron Microscopy: Journal of Electron Microscopy I: 11-22(1997), vol. 46, No. 1 1997.
Kirkland, A.I., et al, "Super-resolution by aperture synthesis: tilt series reconstruction in CTEM," Ultramicroscopy 57, (1995) 355-374, Received May 27, 1994, in final form Oct. 2, 1994; 1995 Elsevier Science B.V. SSDI 0304-3991(94)00191-x.
Kittler, H., et al, "Morphologic changes of pigmented skin lesions: a useful extension of the ABCD rule for dermatoscopy," Journal of the American Academy of Dermatology, 1999. 40(4): p. 558-562.
Kozak, I., "Retinal imaging using adaptive optics technology.," Saudi J. Ophthalmol. Off. J. Saudi Ophthalmol. Soc., vol. 28, No. 2, pp. 117-122, Apr. 2014.
Lauer, V., "New Approach to optical diffraction tomography yielding a vector equation of diffraction tomography and a novel tomography microscope," Journal of Microscopy, vol. 205, Pt 2 Feb. 2002, pp. 165-176, The Royal Microscopical Society 2001.
Lee, K., et al, "Synthetic Fourier transform light scattering," Optics Express 21 (2013).
Levoy, M., et al, "Light field microscopy," ACM Trans. Graphics 25, (2006).
Levoy, M., et al, "Recording and controlling the 4D light field in a microscope using microlens arrays," J. Microsc. 235 (2009).
Li, X., et al, "Sparse signal recovery from quadratic measurements via convex programming," SIAM Journal on Mathematical Analysis 45, No. 5 (2013): 3019-3033.
Lohmann, A. W., et al, "Space-bandwidth product of optical signals and systems," J. Opt. Soc. Am. A 13, pp. 470-473 (1996).
Lue, N., et al, "Live Cell Refractometry Using Hilbert Phase Microscopy and Confocal Reflectance Microscopy," The Journal of Physical Chemistry A, 113, pp. 13327-13330 (2009).
LUXEXCEL® Brochure, LUXEXCEL: 3D Printing Service Description, Retrieved Mar. 7, 2016, 5 pp. [http://www.luxexcel.com].
"Lytro," Retrieved Oct. 23, 2015, 6 pp. [https://www.lytro.com/].
Ma, W., et al, "Rapid Acquisition of Specular and Diffuse Normal Maps from Polarized Spherical Gradient Illumination," University of Southern California, Institute for Creative Technologies, 12 pages (2007).
Mahajan, V. N., "Zernike circle polynomials and optical aberrations of systems with circular pupils," Appl. Opt. 33(34), 8121-8124 (1994).
Maiden, A. M., et al, "A new method of high resolution, quantitative phase scanning microscopy," in: M.T. Postek, D.E. Newbury, S.F. Platek, D.C. Joy (Eds.), SPIE Proceedings of Scanning Microscopy, 7729, 2010.
Maiden, A. M., et al, "An improved ptychographical phase retrieval algorithm for diffractive imaging," Ultramicroscopy 109(10), 1256-1262 (2009).
Maiden, A. M., et al, "Superresolution imaging via ptychography," Journal of the Optical Society of America A. Apr. 2011, vol. 28 No. 4, pp. 604-612.
Maiden, A. M., et al, "Optical ptychography: a practical implementation with useful resolution," Opt. Lett. 35, 2585-2587 (2010).
Marchesini S., "A unified evaluation of iterative projection algorithms for phase retrieval," Rev Sci Instrum 78:011301 (2007).
Marchesini S., et al, "Augmented projections for ptychographic imaging," Inverse Probl 29:115009 (2013).
Marrison, J., et al, "Ptychography—a label free, high-contrast imaging technique for live cells using quantitative phase information," Sci. Rep. 3, 2369 (2013).
Medoff, B.P., et al, "Iterative convolution backprojection algorithms for image reconstruction from limited data," J. Opt. Soc. Am. vol. 73, No. 11, Nov. 1983, pp. 1493-1500.
"Melafind," Retrieved Oct. 23, 2015, 4 pages. [http://www.melafind.com].
Meyer, R.R., et al, "A method for the determination of the wave aberration function of high-resolution TEM," Ultramicroscopy 99 (2004) 115-123: Elsevier B.V. Doi: 10.1016/j.ultramic.2003.11.001.
Miao, J., et al, "High Resolution 3D X-Ray Diffraction Microscopy," Physical Review Letters, Aug. 19, 2002, vol. 89, No. 8, pp. 1-4.
Mico, V., et al, "Synthetic aperture microscopy using off-axis illumination and polarization coding," Optics Communications, pp. 276, 209-217 (2007).
Mico, V., et al, "Synthetic aperture superresolution with multiple off-axis holograms," JOSA A 23, pp. 3162-3170 (2006).
Mir, M. et al, "Optical measurement of cycle-dependent cell growth," Proceedings of the National Academy of Sciences 108, pp. 13124-13129 (2011).
Mir, M., et al, "Blood screening using diffraction phase cytometry," Journal of Biomedical Optics 15, pp. 027016-027014 (2010).
Moreno, I., "Creating a desired lighting pattern with an LED array," 8th International Conference on Solid State Lighting, Proceedings of SPIE, vol. 7058, 2008, 9 pp.
Mrejen, S., et al, "Adaptive optics imaging of cone mosaic abnormalities in acute macular neuroretinopathy.," Ophthalmic Surg. Lasers Imaging Retina, vol. 45, No. 6, pp. 562-569, Jan. 2014.

(56) References Cited

OTHER PUBLICATIONS

Nayar, S. K., et al, "Fast separation of direct and global components of a scene using high frequency illumination," ACM Transactions on Graphics 25(3) (2006).
Ng, R., et al., "Light field photography with a hand-held plenoptic camera", Computer Science Technical Report CSTR, 2005. 2(11).
Nomura, H., and Sato, T., "Techniques for measuring aberrations in lenses used in photolithography with printed patterns," Appl. Opt. 38(13), 2800-2807 (1999).
Ohlsson, H., et al., "Compressive phase retrieval from squared output measurements via semidefinite programming," arXiv:1111.6323 (2011).
Ou, X., et al, "High numerical aperture Fourier ptychography: principle, implementation and characterization," Opt. Express 23:3472-3491 (2015).
Ou, X., et al, "Quantitative phase imaging via Fourier ptychographic microscopy," Optics Letters, 2013. 38(22): p. 4845-4848.
Ou. X., et al, "Embedded pupil function recovery for Fourier ptychographic microscopy," Optics Express 22 (5), pp. 4960-4972 (2014), with Erratum (2015).
Ou. X., et al, "Embedded pupil function recovery for Fourier ptychographic microscopy," submitted Dec. 26, 2013; 13 pp.
Pacheco, S., et al, "Reflective Fourier Ptychography," J. Biomed. Opt. 21(2), pp. 026010-1-026010-7, (Feb. 18, 2016). [http://biomedicaloptics.spiedigitallibrary.org].
Recht, B., et al, "Guaranteed minimum-rank solutions of linear matrix equations via nuclear norm minimization," SIAM Review 52, No. 3 (2010): 471-501.
Reinhard, E., et al, "High Dynamic Range Imaging: Acquisition, Display, and Image-based Lighting" (Morgan Kaufmann, 2010).
Rodenburg, J. M., et al, "A phase retrieval algorithm for shifting illumination," Appl. Phys. Lett. 85, 4795-4797 (2004).
Rodenburg, J. M., et al, "Hard-X-ray lensless imaging of extended objects," Phys. Rev. Lett. 98, 034801 (2007).
Rodenburg, J. M., et al, "The theory of super-resolution electron microscopy via Wigner-distribution deconvolution," Phil. Trans. R. Soc. Lond. A 339, 521-553 (1992).
Rodenburg, J., "Ptychography and related diffractive imaging methods," Adv. Imaging Electron Phys.150, 87-184 (2008).
Rossi, E.A., et al, "In vivo imaging of retinal pigment epithelium cells in age related macular degeneration.," Biomed. Opt. Express, vol. 4, No. 11, pp. 2527-2539, Jan. 2013.
Rowe, M., et al, "Polarization-difference imaging: a biologically inspired technique for observation through scattering media," Optics Letters, vol. 20, No. 6, 3 pages (1995).
Schechner, Y., "Multiplexing for Optimal Lighting," IEEE Transactions on Pattern Analysis and Machine Intelligence, vol. 29, No. 8, 1339-1354 (2007).
Schnars, U., et al, "Digital recording and numerical reconstruction of holograms," Measurement Science and Technology, 13, R85 (2002).
Schwarz, C., et al, "Imaging interferometric microscopy," Optics letters 28, pp. 1424-1426 (2003).
Shechner, Y., et al, "Polarization-based vision through haze," Applied Optics 42(3), (2003).
Shechtman, Y., et al, "Sparsity based sub-wavelength imaging with partially incoherent light via quadratic compressed sensing," Opt Express 19:14807-14822 (2011).
Siegel, R., et al, "Cancer statistics 2013," CA: a cancer journal for clinicians, 2013. 63(1): p. 11-30.
Stoecker, W., et al, "Diagnostic Inaccuracy of Smartphone Applications for Melanoma Detection: Representative Lesion Sets and the Role for Adjunctive Technologies," JAMA Dermatology, 2013. 149(7): p. 884.
Sun, D., et al, "Estimating a signal from a magnitude spectrogram via convex optimization," arXiv:1209.2076 (2012).
Sun, J., et al,"Coded multi-angular illumination for Fourier ptychography based on Hadamard codes," 5 pages (2015).
Tam, K., et al, "Tomographical imaging with limited-angle input," J. Opt. Soc. Am. 21 (1981).

Thibault, P. et al, "Probe retrieval in ptychographic coherent diffractive imaging," Ultramicroscopy 109(4), 338-343 (2009).
Thibault, P., et al, "High-resolution scanning X-ray diffraction microscopy," Science 321, 2008, pp. 379-382.
Thomas, L., et al, "Semiological value of ABCDE criteria in the diagnosis of cutaneous pigmented tumors," Dermatology, 1998. 197(1): p. 11-17.
Tian, L., et al,"Multiplexed Coded Illumination for Fourier Ptychography with an LED Array Microscope," Optical Society of America, 14 pages (2014).
Tippie, A.E., et al, "High-resolution synthetic-aperture digital holography with digital phase and pupil correction," Opt. Express 19, pp. 12027-12038 (2011).
Turpin, T., et al, "Theory of the synthetic aperture microscope," pp. 230-240 (1995).
Tyson, R., "Principles of Adaptive Optics" (CRC Press, 2010).
Vulovic, M., et al, "When to use the projection assumption and the weak-phase object approximation in phase contrast cryo-EM," Ultramicroscopy 136 (2014) 61-66.
Waldspurger, I., et al, "Phase recovery, maxcut and complex semidefinite programming," Mathematical Programming 149, No. 1-2 (2015): 47-81.
Wang, Q., et al, "Adaptive Optics Microperimetry and OCT Images Show Preserved Function and Recovery of Cone Visibility in Macular Telangiectasia Type 2 Retinal Lesions," Invest. Ophthalmol. Vis. Sci., vol. 56, pp. 778-786 (2015).
Wang, Z., et al, "Tissue refractive index as marker of disease," Journal of Biomedical Optics 16, 116017-116017 (2011).
Watanabe, M., et al, "Telecentric optics for focus analysis," IEEE trans. pattern. anal. mach. intell., 19 1360-1365 (1997).
Wesner, J., et al, "Reconstructing the pupil function of microscope objectives from the intensity PSF," in Current Developments in Lens Design and Optical Engineering III, R. E. Fischer, W. J. Smith, and R. B. Johnson, eds., Proc. SPIE 4767, 32-43 (2002).
Williams, A., et al, "Fourier ptychographic microscopy for filtration-based circulating tumor cell enumeration and analysis," J. Biomed. Opt. 19(6), 066007 (2014).
Wolf, J., et al, "Diagnostic Inaccuracy of Smartphone Applications for Melanoma Detection," JAMA Dermatology, 2013, 149(7): p. 885-885.
Wu, J., et al, "Focal plane tuning in wide-field-of-view microscope with Talbot pattern illumination," Opt. Lett. 36, 2179-2181 (2011).
Wu, J., et al, "Wide field-of-view microscope based on holographic focus grid illumination," Opt. Lett. 35, 2188-2190 (2010).
Xu, W., et al, "Digital in-line holography for biological applications," Proc. Natl Acad. Sci. USA 98, pp. 11301-11305 (2001).
Yuan, C., et al, "Angular multiplexing in pulsed digital holography for aperture synthesis," Optics Letters 33, pp. 2356-2358 (2008).
Zeiss, C., "Microscopy, Cells Need the Perfect Climate, System Solutions for Live Cell Imaging under Physiological Conditions," printed Feb. 2008, 1-42 pgs.
Zhang, Y., et al, "Self-learning based fourier ptychographic microscopy," Optics Express, 16pgs (2015).
Zhang, Y., et al, "Photoreceptor Perturbation Around Subretinal Drusenoid Deposits as Revealed by Adaptive Optics Scanning Laser Ophthalmoscopy," Am. J. Ophthalmol., vol. 158, No. 3, pp. 584-596, 2014.
Zheng, G., et al, "Characterization of spatially varying aberrations for wide field-of-view microscopy," Opt. Express 21, 15131-15143 (2013).
Zheng, G., et al, "Microscopy refocusing and dark-field imaging by using a simple LED array," Opt. Lett. 36, 3987-3989 (2011).
Zheng, G., et al, "0.5 gigapixel microscopy using a flatbed scanner," Biomed. Opt. Express 5, 1-8 (2014).
Zheng, G., et al, "Sub-pixel resolving optofluidic microscope for on-chip cell imaging," Lab Chip 10, pp. 3125-3129 (2010).
Zheng, G. "The ePetri dish, an on-chip cell imaging platform based on subpixel perspective sweeping microscopy (SPSM)," Proc. Natl. Acad. Sci. USA 108, pp. 16889-16894 (2011).
Zheng, G., et al, "Wide-field, high-resolution Fourier ptychographic microscopy," Nature Photonics, vol. 7, pp. 739-745, Published Online Jul. 28, 2013 at www.nature.com/naturephotonics.

(56) References Cited

OTHER PUBLICATIONS

Chung, J., et al, "Wide-field Fourier ptychographic microscopy using laser illumination source," Optical Society of America, 13 pgs., Mar. 23, 2016.
Guo, K., et al, "Optimization of sampling pattern and the design of Fourier ptychographic illuminator," Optical Society of America; Optics Express , vol. 23, No. 5, pp. 6171-6180 (2015).
Phillips, Z., et al, "Multi-Contrast Imaging and Digital Refocusing on a Mobile Microscope with a Domed LED Array," PLoS One, 10 (5), pp. 1-13 (2015).
Horstmeyer, R., et al, "Standardizing the resolution claims for coherent microscopy," Nature Photonics, vol. 10, pp. 68-71, Feb. 2016.
Horstmeyer, R., et al, "Solving ptychography with a convex relaxation," New Journal of Physics, vol. 17 (2015) 1-14 pages.
U.S. Notice of Allowance dated Aug. 23, 2016 in U.S. Appl. No. 14/466,481.
U.S. Office Action dated Aug. 16, 2016 in U.S. Appl. No. 14/065,280.
U.S. Office Action dated Sep. 16, 2016 I U.S. Appl. No. 14/065,305.
U.S. Notice of Allowance dated Nov. 2, 2016 in U.S. Appl. No. 14,572,493.
U.S. Supplemental Notice of Allowance dated Dec. 12, 2016 in U.S. Appl. No. 14/572,493.
U.S. Notice of Allowance dated Jan. 13, 2017 in U.S. Appl. No. 14/065,305.
U.S. Final Office Action dated Jan. 23, 2017 in U.S. Appl. No. 15/007,196.
U.S. Office Action dated Feb. 21, 2017 in U.S. Appl. No. 14/960,252.
U.S. Supplemental Notice of Allowability dated Mar. 2, 2017 in U.S. Appl. No. 14/065,305.
U.S. Notice of Allowance dated Mar. 8, 2017 in U.S. Appl. No. 14/572,493.
U.S. Office Action dated Mar. 13, 2017 in U.S. Appl. No. 14/658,019.
U.S. Notice of Allowance dated Mar. 22, 2017 in U.S. Appl. No. 15/007,196.
U.S. Office Action dated Mar. 24, 2017 in U.S. Appl. No. 14/710,947.
U.S. Notice of Allowance dated Mar. 31, 2017 in U.S. Appl. No. 14/572,493.
U.S. Final Office Action dated Apr. 3, 2017 in U.S. Appl. No. 14/065,280.
International Search Report and Wrtitten Opinion dated Sep. 5, 2016 issued in PCT/US2016/033638.
Chinese Office Action [Description in English] dated Jul. 11, 2016 issued in Application No. CN 201380068831.6.
Chinese Office Action [Description in English] dated Dec. 13, 2016 issued in Application No. CN201480057911.6.
Extended European Search Report dated Feb. 16, 2017 issued in Application No. 14837844.1.
Extended European Search Report dated Feb. 15, 2017 issued in Applicatoin No. 14832857.8.
Chinese Second Office Action [Description in English] dated Feb. 17, 2017 issued in Application No. CN201380068831.6.
Kim, M., et al, "High-speed synthetic aperture microscopy for live cell imaging," Optics Letters, vol. 36, No. 2, Jan. 15, 2011, pp. 148-150. <doi:10.1364/OL.36.000148>.
Lu, H., et al, "Quantitative phase imaging and complex field reconstruction by pupil modulation differential phase contrast," Optics Express, vol. 24, No. 22, Oct. 31, 2016, pp. 25345-25361. <doi:10.1364/OE.24.025345>.
Ou, X., et al, "Aperture scanning Fourier ptychographic microscopy," Biomedical Optics Express, vol. 7, No. 8, Aug. 1, 2016, pp. 3140-3150. <doi:10.1364/BOE.7.003140>.
Horstmeyer, R., et al, "Diffraction tomography with Fourier ptychography," Optica, vol. 3, No. 8, Aug. 2016, pp. 827-835. <doi:10.1364/OPTICA.3.000827>.
Bian, L., et al, "Fourier ptychographic reconstruction using Poisson maximum likelihood and truncated Wirtinger gradient," NPG: Scientific Reports 6, article No. 27384, Jun. 10, 2016, pp. 1-10. <doi:10.1038/srep27384> [URL: http://www.nature.com/scientificreports/].

Wu, J., et al, "Harmonically matched grating-based full-field quantitative high-resolution phase microscope for observing dynamics of transparent biological samples," OSA Publ., Optics Express, vol. 15, No. 26, Dec. 24, 2007, pp. 18141-18155. <doi:10.1364/OE.15.018141>.
Wu, J., et al, "Paired-angle-rotation scanning optical coherence tomography forward-imaging probe," OSA Publ., Optics Letters, vol. 31, No. 9, May 1, 2006, pp. 1265-1267. <doi: 10.1364/OL.31.001265>.
Kawata, S. et al, "Optical microscope tomography. I. Support constraint," Journal Optical Society America A, vol. 4, No. 1, Jan. 1987, pp. 292-297. <doi:10.1364/JOSAA.4.000292>.
Chai, A., et al, "Array imaging using intensity-only measurements," IOP Publishing Inverse Problems, vol. 27, No. 1, Jan. 2011, pp. 1-16. <doi:10.1088/0266-5611/27/1/015005> [Retrieved on Mar. 24, 2017] [URL: http://www.stacks.iop.org/IP/27/015005].
U.S. Office Action dated May 19, 2017 in U.S. Appl. No. 15/081,659.
Preliminary Amendment dated Mar. 17, 2014 filed in U.S. Appl. No. 14/065,280.
Preliminary Amendment dated Apr. 25, 2016 filed in U.S. Appl. No. 14/710,947.
Preliminary Amendment dated Nov. 28, 2016 filed in U.S. Appl. No. 15/206,859.
Preliminary Amendment dated Mar. 17, 2014 filed in U.S. Appl. No. 14/065,305.
Preliminary Amendment dated Nov. 28, 2016 filed in U.S. Appl. No. 15/209,604.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Jun. 9, 2017 in U.S. Appl. No. 15/007,196.
U.S. Notice of Allowance dated Jun. 20, 2017 in U.S. Appl. No. 14/572,493.
U.S. Supplemental Notice of Allowance dated Jun. 28, 2017 in U.S. Appl. No. 15/206,859.
U.S. Notice of Allowance dated Aug. 16, 2017 in U.S. Appl. No. 15/209,604.
Office Action dated Aug. 31, 2017 in U.S. Appl. No. 15/636,494.
U.S. Notice of Allowance dated Sep. 1, 2017 in U.S. Appl. No. 15/206,859.
Notice of Allowance dated Sep. 20, 2017 in U.S. Appl. No. 15/007,196.
Notice of Allowance dated Oct. 11, 2017 in U.S. Appl. No. 14/572,493.
Notice of Allowance dated Oct. 20, 2017 in U.S. Appl. No. 15/081,659.
Office Action dated Nov. 3, 2017 in U.S. Appl. No. 15/068,389.
Office Action dated Nov. 30, 2017 in U.S. Appl. No. 15/007,159.
Notice of Allowance dated Dec. 4, 2017 in U.S. Appl. No. 14/065,305.
Final Office Action dated Dec. 14, 2017 in U.S. Appl. No. 14/960,252.
Final Office Action dated Dec. 28, 2017 in U.S. Appl. No. 14/710,947.
Final Office Action dated Jan. 17, 2018 in U.S. Appl. No. 14/658,019.
Notice of Allowance dated Jan. 23, 2018 in U.S. Appl. No. 15/206,859.
Office Action dated Jan. 25, 2018 in U.S. Appl. No. 14/065,280.
Notice of Allowance dated Jan. 26, 2018 in U.S. Appl. No. 15/209,604.
Chinese Second Office Action [Description in English] dated Jan. 22, 2017 issued in Application No. CN201380068831.6.
International Preliminary Report on Patentability dated Jun. 15, 2017 issued in Application No. PCT/US2015/064126.
European Office Action dated May 16, 2017 issued in European Patent Application No. 13851670.3.
International Preliminary Report on Patentability dated Jul. 6, 2017 issued in Application No. PCT/US2015/067498.
International Preliminary Report on Patentability dated Aug. 3, 2017 issued in Application No. PCT/US2016/014343.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
Chinese Third Office Action [Summary in English] dated Jul. 24, 2017 issued in Application No. 201380068831.6.

(56) References Cited

OTHER PUBLICATIONS

Chinese First Office Action [Summary in English] dated Aug. 2, 2017 issued in Application No. CN 201480054301.0.
Australian Office Action dated Sep. 18, 2017 issued in Application No. AU 2014296034.
International Preliminary Report on Patentability dated Sep. 28, 2017 issued in Application No. PCT/US2016/022116.
Japanese Office Action dated Oct. 17, 2017 issued in Application No. 2015-539884.
Chinese Office Action [Summary in English] dated Oct. 26, 2017 issued in CN 201480057911.6.
International Preliminary Report on Patentability dated Nov. 30, 2017 issued in PCT/US2016/033638.
Abrahamsson, S., et al., "Fast multicolor 3D imaging using aberration-corrected mulitfocus microscopy," Brief Communications: Nature Methods, vol. 10, No. 1, Jan. 2013, pp. 60-65. <doi:10.1038/nmeth.2277>.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. <doi:10.1126/sciadv.1602564> [retrieved on Nov. 28, 2017] <URL:http://advances.sciencemag.org/>.
Kner, P., "Phase diversity for three-dimensional imaging," Journal of the Optical Society of America A, vol. 30, No. 10, Oct. 1, 2013, pp. 1980-1987. <doi:10.1364/JOSAA.30.001980>.
Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. <doi:10.1109/ICCPhot.2012.6215212>.
Tian, L., et al, "Computional illumination for high-speed in vitro Fourier ptychographic microscropy," Optica: Research Article, vol. 2, No. 10, Oct. 14, 2015, pp. 904-911. <doi:10.1364/OPTICA.2.000904>.
Wills, S., "Synthetic Apertures for the Optical Domain," Optics & Photonics News Article [webpage], The Optical Society (OSA), Apr. 18, 2017, pp. 2. <URL:https://www.osa-opn.org/home/newsroom/2017/april/synthetic_apertures_for_the_optical_domain/>.
Yeh, et al., "Experimental robustness of Fourier ptychography phase retrieval algorithms," Optics Express, vol. 23, No. 26, Dec. 28, 2015, pp. 33214-33240. <doi: 10.1364/OE.23.033214>.
Zheng, G., "Fourier Ptychographic Imaging: A MATLAB tutorial," IOP Concise Physics, Morgan & Claypool Publication, San Rafael, CA., May 2016, pp. 96. <ISBN: 978-1-6817-4272-4 (ebook)> <doi: 10.1088/978-1-6817-4273-1>.
Zheng, G., et al, "Wide-field, high-resolution Fourier ptychographic microscopy," Nature Photonics, vol. 7, Sep. 2013, Published Online Jul. 28, 2013, pp. 739-746. <doi:10.1038/NPHOTON.2013.187>.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).
Reinhard, E., et al, "High Dynamic Range Imaging: Acquisition, Display, and Image-based Lighting" Second Edition § 5.2 HDR Image Capture: Morgan Kaufmann, May 28, 2010, pp. 148-151. <ISBN: 9780123749147>.
U.S. Appl. No. 15/820,295, filed Nov. 21, 2017, Ou.
Preliminary Amendment dated Jun. 13, 2018 filed in U.S. Appl. No. 15/820,295.
U.S. Notice of Allowance dated Jul. 25, 2018 in U.S. Appl. No. 14/710,947.
U.S. Notice of Allowance dated Jun. 27, 2018 in U.S. Appl. No. 15/636,494.
U.S. Notice of Allowance dated Jul. 16, 2018 in U.S. Appl. No. 15/007,159.
Office Action Interview Summary dated May 3, 2018 in U.S. Appl. No. 15/068,389.
Final Office Action dated Jun. 6, 2018 issued in U.S. Appl. No. 15/068,389.
Notice of Allowance dated Feb. 9, 2018 in U.S. Appl. No. 15/081,659.
Office Action dated Apr. 13, 2018 issued in U.S. Appl. No. 15/160,941.
Japanese First Office Action dated Jul. 31, 2018 issued in Application No. JP 2016-531919.
European Extended Search Report dated Jun. 6, 2018 issued in Application No. 15865492.1.
Extended European Search Report dated Aug. 8, 2018 issued in Application No. EP 16744002.3.
Extended European Search Report dated Jul. 3, 2018 issued in Application No. EP 15874344.3.
Chinese Third Office Action dated Jul. 13, 2018 issued in CN 201480057911.6.
Australian Examination Report 1/Office Action dated Jan. 18, 2018 issued in AU 2014308673.
Chinese First Office Action dated Feb. 24, 2018 issued in CN 201680003937.1.
Jacques, et al., "Imaging Superficial Tissues With Polarized Light," Lasers in Surgery and Medicine, vol. 26, No. 2, Apr. 25, 2000, pp. 119-129.
Jensen, et al. "Types of imaging, Part 2: An Overview of Fluorescence Microscopy." The Anatomical Record, vol. 295, No. 10, Oct. 1, 2012, pp. 1621-1627.
Sarder, et al. "Deconvolution Methods for 3-D Fluorescence Microscopy Images," IEEE Signal Processing Magazine, vol. 23, No. 3, May 2006, pp. 32-45.
U.S. Appl. No. 15/963,966, filed Apr. 26, 2018, Ou et al.
U.S. Appl. No. 15/959,050, filed Apr. 20, 2018, Horstmeyer et al.
Preliminary Amendment filed Jul. 11, 2018 in U.S. Appl. No. 15/959,050.
Preliminary Amendment filed Jul. 23, 2018 in U.S. Appl. No. 15/963,966.
U.S. Final Office Action dated Nov. 29, 2018 in U.S. Appl. No. 14/065,280.
U.S. Office Action dated Dec. 26, 2018 in U.S. Appl. No. 15/963,966.
U.S. Notice of Allowance dated Apr. 19, 2019 in U.S. Appl. No. 15/963,966.
U.S. Office Action dated Dec. 26, 2018 in U.S. Appl. No. 15/959,050.
U.S. Notice of Allowance dated Sep. 17, 2018 in U.S. Appl. No. 15/820,295.
U.S. Notice of Allowance dated Jan. 14, 2019 in U.S. Appl. No. 15/820,295.
U.S. Notice of Allowance dated Apr. 16, 2019 in U.S. Appl. No. 15/820,295.
U.S. Office Action dated Oct. 4, 2018 in U.S. Appl. No. 14/658,019.
U.S. Office Action dated Mar. 8, 2019 in U.S. Appl. No. 16/171,270.
U.S. Office Action dated Dec. 13, 2018 in U.S. Appl. No. 14/960,252.
U.S. Notice of Allowance dated Oct. 5, 2018 in U.S. Appl. No. 15/636,494.
U.S. Office Action dated Apr. 4, 2019 in U.S. Appl. No. 16/162,271.
U.S. Office Action dated Sep. 7, 2018 in U.S. Appl. No. 14/979,154.
U.S. Office Action dated Jan. 17, 2019 issued in U.S. Appl. No. 15/068,389.
U.S. Notice of Allowance dated Oct. 19, 2018 issued in U.S. Appl. No. 15/160,941.
U.S. Notice of Allowance dated Jan. 15, 2019 issued in U.S. Appl. No. 15/620,674.
U.S. Notice of Allowance dated Apr. 29, 2019 issued in U.S. Appl. No. 15/620,674.
Chinese First Office Action dated Jan. 28, 2019 issued in CN 201580072950.8.
European Extended Search Report dated Aug. 14, 2018 issued in EP 16744003.1.
Chinese First Office Action dated Dec. 28, 2018 issued in Application No. CN 201680005491.6.
Chinese First Office Action dated Apr. 19, 2019 issued in Application No. CN 201680006738.6.
Chinese First Office Action dated Dec. 26, 2018 issued in Application No. CN 201580067354.0.
Extended European Search Report dated Sep. 12, 2018 issued in Application No. EP 16740769.1.
Chinese Second Office Action dated Jul. 3, 2018 issued in Application No. CN 201480054301.0.
Extended European Search Report dated Oct. 25, 2018 issued in Application No. EP 16765505.9.

(56) References Cited

OTHER PUBLICATIONS

Chinese First Office Action dated Apr. 19, 2019 issued in Application No. CN 201680014898.5.
International Search Report and Written Opinion dated Feb. 22, 2019 issued in PCT/US2018/059059.
Pankajakshan, P., "Blind Deconvolution for Confocal Laser Scanning Microscopy," Doctoral dissertation, Universite Nice Sophia Antipolis, 2009. <URL: https://tel.archives-ouvertes.ft/tel-00474264>.
U.S. Appl. No. 16/242,934, filed Jan. 8, 2019, Kim et al.
U.S. Appl. No. 16/252,465, filed Jan. 18, 2019, Ou et al.
U.S. Office Action dated Jun. 26, 2019 issued in U.S. Appl. No. 14/065,280.
U.S. Final Office Action dated Jun. 3, 2019 in U.S. Appl. No. 15/959,050.
U.S. Final Office Action dated May 30, 2019 in U.S. Appl. No. 14/658,019.
U.S. Notice of Allowance dated Aug. 12, 2019 in U.S. Appl. No. 14/960,252.
U.S. Final Office Action dated May 30, 2019 in U.S. Appl. No. 14/979,154.
U.S. Final Office Action dated Jun. 19, 2019 issued in U.S. Appl. No. 15/068,389.
U.S. Notice of Allowance dated Aug. 14, 2019 issued in U.S. Appl. No. 15/620,674.
Adie, et al., "Computational adaptive optics for broadband optical interferometric tomography of biological tissue," Proc. Natl. Acad. Sci. USA 109, 7175-7180 (May 8, 2012).
Bian, et al., "Content adaptive illumination for Fourier ptychography," Opt. Lett., vol. 39, (Aug. 2014) pp. 6648-6651.
Bioucas-Dias, et al., "Total variation-based image deconvolution: a majorization-minimization approach," ICASSP (2), pp. 861-864 (May 14, 2006).
Booth, "Adaptive optical microscopy: the ongoing quest for a perfect image," Light Sci. Appl. 3, e165 (Apr. 25, 2014 ).
Chung, et al., "Computational aberration compensation by coded-aperture-based correction of aberration obtained from optical Fourier coding and blur estimation," Optica, vol. 6, May 10, 2019, pp. 647-661.
Dowski, et al., "Extended depth of field through wavefront coding," Appl. Opt., vol. 34, Apr. 10, 1995, pp. 1859-1866.
Evered, et al., "Accuracy and perceptions of virtual microscopy compared with glass slide microscopy in cervical cytology," Cytopathology, vol. 22, Feb. 2, 2010, pp. 82-87.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fried, D.L.,"Anisoplanatism in adaptive optics," J. Opt. Soc. Am. 72, pp. 52-61 (Jan. 1982).
G. Gunjala, S. Sherwin, A. Shanker, and L. Waller, "Aberration recovery by imaging a weak diffuser," Opt. Express 26, 21054-21068 (Aug. 6, 2018).
G. McConnell, J. Trägårdh, R. Amor, J. Dempster, E. Reid, and W. B. Amos, "A novel optical microscope for imaging large embryos and tissue volumes with sub-cellular resolution throughout," eLife 5, e18659 (Sep. 23, 2016).
G. Muyo and A. R. Harvey, "Wavefront coding for athermalization of infrared imaging systems," Proc. SPIE 5612, 227-235 (Dec. 2004).
G. Muyo, et al., "Infrared imaging with a wavefront-coded singlet lens," Opt. Express, vol. 17, Nov. 5, 2009, pp. 21118-21123.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Godden, T.M. et al., "Ptychographic microscope for three-dimensional imaging," Optics Express, vol. 22, No. 10, May 19, 2014, pp. 12513-12523.
Gustafsson, M.,"Nonlinear structured-illumination microscopy: widefield fluorescence imaging with theoretically unlimited resolution," Proc. Natl. Acad. Sci. USA 102, 13081-13086 (Sep. 13, 2005).
H. Hofer, L. Chen, G. Y. Yoon, B. Singer, Y. Yamauchi, and D. R. Williams, "Improvement in retinal image quality with dynamic correction of the eye's aberrations," Opt. Express 8, 631-643 (May 21, 2001).
Hillmann, et al., "Aberration-free volumetric high-speed imaging of in vivo retina," Sci. Rep. 6, 35209 (Oct. 20, 2016).
Kamal, et al., "In situ retrieval and correction of aberrations in moldless lenses using Fourier ptychography," Opt. Express, vol. 26, No. 3, pp. 2708-2719 (Feb. 5, 2018).
Kuang, et al., "Digital micromirror device-based laserillumination Fourier ptychographic microscopy," Opt. Express 23, 26999-27010 (Oct. 19, 2015).
Kubala, et al., "Reducing complexity in computational imaging systems," Opt. Express 11, 2102-2108 (2003).
Kumar, et al., "Subaperture correlation based digital adaptive optics for full field optical coherence tomography," Opt. Express, vol. 21, May 6, 2013, pp. 10850-10866.
Kundur, et al., "Blind Image Deconvolution," IEEE Signal Process. Mag. 13(3), pp. 43-64 (May 1996).
Levin et al., "Image and depth from a conventional camera with a coded aperture," ACM Trans. Graph. 26, 70 (2007).
Levin, et al., "Understanding blind deconvolution algorithms," IEEE Trans. Pattern Anal. Mach. Intell., vol. 33, No. 12, Dec. 2011, pp. 2354-2367.
Li, et al., "Separation of threedimensional scattering effects in tilt-series Fourier ptychography," Ultramicroscopy 158, 1-7 (Jun. 14, 2015).
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Marcos, et al., "Vision science and adaptive optics, the state of the field," Vis. Res. 132, 3-33 (Mar. 2017).
Martins da Silva et al., "Photosensitivity and epilepsy: current concepts and perspectives—a narrative review," Seizure 50, 209-218 (2017).
Neumaier, "Solving ill-conditioned and singular linear systems: a tutorial on regularization," SIAM Rev. 40, 636-666 (1998).
Pan, et al., "Subwavelength resolution Fourier ptychography with hemispherical digital condensers," Opt. Express 26, 23119-23131 (Sep. 3, 2018).
Pan, et al., "System calibration method for Fourier ptychographic microscopy," J. Biomed. Opt. 22, 096005 (Sep. 12, 2017).
Pan, et al., "Three-dimensional space optimization for near-field ptychography," Opt. Express 27, 5433-5446 (Feb. 18, 2019).
Pankajakshan, P., "Blind Deconvolution for Confocal Laser Scanning Microscopy," Doctoral dissertation, Universite Nice Sophia Antipolis, 2009. <URL: https://tel.archives-ouvertes.fr/tel-00474264>.
Qian, et al., "Large-scale 3D imaging of insects with natural color," Opt. Express 27, 4845-4857 (Feb. 18, 2019).
Reinig, et al., "Adaptative optics microscopy enhances image quality in deep layers of Clarity processed brains of YFP-H mice" Proc., of SPIE , vol. 9690, (Mar. 9, 2016) pp. 969008-1-969008-12. <doi:10.1117/12.2213283>.
Rha, et al., "Adaptive optics flood-illumination camera for high speed retinal imaging," Opt. Express 14, 4552-4569 (2006).
Shemonski, et al., "Computational high-resolution optical imaging of the living human retina," Nat. Photonics 9, 440-443 (Jun. 22, 2015).
Soulez, et al., "Blind deconvolution of 3D data in wide field fluorescence microscopy" In 2012 9th IEEE International Symposium on Biomedical Imaging (ISBI) May 2, 2012, pp. 1735-1738.
Sun, et al., "Efficient positional misalignment correction method for Fourier ptychographic microscopy," Biomed. Opt. Express 7, 1336-1350 (Mar. 17, 2016).

(56) References Cited

OTHER PUBLICATIONS

Sun, et al., "Resolution-enhanced Fourier ptychographic microscopy based on high-numerical-aperture illuminations," Sci. Rep. 7, 1187 (Apr. 26, 2017).
Sun, et al., "Sampling criteria for Fourier ptychographic microscopy in object space and frequency space," Opt. Express 24, 15765-15781 (Jul. 11, 2016).
Thiébaut and Conan, "Strict a priori constraints for maximumlikelihood blind deconvolution," J. Opt. Soc. Am. A, vol. 12, No. 3, Mar. 1995, pp. 485-492.
Tian and Waller, "3D intensity and phase imaging from light field measurements in an LED array microscope," Optica 2, 104-111 (Jan. 28, 2015).
Tomer et al., "Advanced Clarity for rapid and high-resolution imaging of intact tissues," Nat. Protoc., vol. 9, No. 7, Jul. 2014, pp. 1682-1697.
Wade, et al., "A fast, robust pattern recognition system for low light level image registration and its application to retinal imaging," Opt. Express 3, 190-197 (1998).
Williams, D., "Imaging Single Cells in the Living Retina," Vis. Res. 51, pp. 1379-1396 (Jul. 1, 2011).
Yaroslavsky, "Image Resampling and Building Continuous Image Models", Chapter 6, Theoretical Foundations of Digital Imaging Using MATLAB , pp. 293-342 (CRC Press, 1 edition, Nov. 26, 2012).
Yuan, et al., "Image deblurring with blurred/noisy image pairs," ACM Trans. Graph. 26, 1 (2007).
Zhou, et al., "What are good apertures for defocus deblurring?" in 2009 IEEE International Conference on Computational Photography (IEEE, Apr. 16-17, 2009), pp. 1-8.
U.S. Appl. No. 16/552,948, filed Aug. 27, 2019, Chung et al.
U.S. Ex Parte Quayle Action dated Aug. 8, 2019 issued in U.S. Appl. No. 16/242,934.
U.S. Notice of Allowance dated Sep. 17, 2019 in U.S. Appl. No. 14/960,252.
U.S. Notice of Allowance dated Sep. 16, 2019 issued in U.S. Appl. No. 15/068,389.
U.S. Notice of Allowance dated Sep. 25, 2019 issued in U.S. Appl. No. 15/620,674.
U.S. Office Action dated Oct. 11, 2019 issued in U.S. Appl. No. 16/179,688.
Desjardins, et al., "Angle-resolved Optical Coherence Tomography with sequential selectivity for speckle reduction" Optics Express, vol. 15, No. 10, May 14, 2007, pp. 6200-6209.
Li, et al., "GPU accelerated parallel FFT processing for Fourier transform hyperspectral imaging," Applied Optics, vol. 54, No. 13, May 1, 2015, pp. D91-D98.
U.S. Appl. No. 16/572,497, filed Sep. 16, 2019, Ou et al.
U.S. Office Action dated Sep. 23, 2019 issued in U.S. Appl. No. 16/252,465.
U.S. Notice of Allowance dated Nov. 20, 2019 in U.S. Appl. No. 15/959,050.
U.S. Office Action dated Jan. 9, 2020 in U.S. Appl. No. 14/658,019.
U.S. Notice of Allowance dated Jan. 6, 2020 in U.S. Appl. No. 14/960,252.
U.S. Notice of Allowance dated Nov. 4, 2019 issued in U.S. Appl. No. 16/242,934.
U.S. Notice of Allowance dated Dec. 9, 2019 in U.S. Appl. No. 16/162,271.
Chinese Second Office Action dated Nov. 12, 2019 issued in Application No. CN 201680005491.6.
Chinese Second Office Action dated Nov. 28, 2019 issued in Application No. CN 201680006738.6.
U.S. Notice of Allowance dated Jan. 29, 2020 issued in U.S. Appl. No. 14/065,280.
U.S. Notice of Allowance dated Feb. 18, 2020 issued in U.S. Appl. No. 16/242,934.
U.S. Notice of Allowance dated Mar. 2, 2020 issued in U.S. Appl. No. 14/797,154.
U.S. Notice of Allowance dated Jan. 24, 2020 issued in U.S. Appl. No. 15/068,389.
Chinese Second Office Action dated Dec. 31, 2019 issued in CN 201580072950.8.
U.S. Notice of Allowance dated Apr. 3, 2020 in U.S. Appl. No. 16/162,271.
U.S. Notice of Allowance dated Apr. 7, 2020 issued in U.S. Appl. No. 16/179,688.
Chinese Second Office Action dated Mar. 19, 2020 issued in Application No. CN 201680014898.5.

* cited by examiner

*--- PRIOR ART ---*

Number of region overlaps *n* (log)

Number of region overlaps *n* (log)

2D FP Method

3D FPT method

FOURIER PTYCHOGRAPHIC TOMOGRAPHY

CROSS-REFERENCES TO RELATED APPLICATIONS

This is a non-provisional application that claims priority to and benefit of U.S. Provisional Patent Application No. 62/106,133, titled "Ptychographic reconstruction of volumetric samples" and filed on Jan. 21, 2015, which is hereby incorporated by reference in its entirety and for all purposes.

STATEMENT AS TO RIGHTS TO INVENTIONS MADE UNDER FEDERALLY SPONSORED RESEARCH OR DEVELOPMENT

This invention was made with government support under Grant No. OD007307 awarded by the National Institutes of Health. The government has certain rights in the invention.

FIELD

Certain embodiments described herein are generally related to digital imaging. More specifically, certain embodiments relate to Fourier ptychographic tomography systems and methods for high resolution imaging of thick samples.

BACKGROUND

Fourier ptychography (FP) is a recently introduced technique of acquiring a high-resolution sample amplitude and phase measurement from a series of low-resolution intensity images captured under varied illumination conditions. Details of conventional FP techniques can be found in G. Zheng, R. Horstmeyer, and C. Yang, "Wide-field, high-resolution Fourier ptychographic microscopy," Nature Photonics (2013) and in U.S. patent application Ser. No. 14/065,280 titled "Fourier Ptychographic Imaging Systems, Devices, and Methods" and filed on Oct. 28, 2013; both of which are hereby incorporated by reference in their entirety.

Conventional FP systems use an array of light emitting diodes (LEDs) or other discretized illumination source located beneath a thin, semi-transparent sample of interest as a variable illumination source. The light from each individually illuminated LED passes through the thin, semi-transparent sample and into an imaging lens (e.g., a microscope objective) to form each unique FP image which is acquired by an image sensor. The sequence of acquired images can then be combined into a high-resolution complex measurement through a phase-retrieval algorithm. These conventional FP techniques are based on the thin sample approximation and are successful for thin samples up to a thickness of 25 µm along the axial dimension, z.

SUMMARY

Certain aspects pertain to Fourier ptychographic tomography systems and methods for high resolution imaging of thick samples.

Certain aspects pertain to Fourier ptychographic tomographic systems. In some aspects, a Fourier ptychographic tomographic system comprises a variable illumination source (e.g. LED matrix) configured to provide plane wave illumination sequentially at different illumination angles to a thick sample being imaged. The Fourier ptychographic tomographic system further comprises an optical system (e.g. objective lens) configured to collect light passing through the thick sample from the variable illumination source and focus the collected light. The Fourier ptychographic tomographic system further comprises an image sensor configured to receive the focused light from the optical system and acquire a sequence of uniquely illuminated intensity measurements associated with the different illumination angles. The Fourier ptychographic tomographic system further comprises a processor for constructing three-dimensional tomographic data of the thick sample by iteratively determining three-dimensional tomographic data in the Fourier domain that is self-consistent with the uniquely illuminated intensity measurements. In some cases, the processor constructs the three-dimensional tomographic data by updating voxels that intersect with overlapping surface areas (e.g. overlapping by at least 70%, overlapping by at least 80%, and overlapping by at least 65%) in a three-dimensional sample spectrum in the Fourier domain with the uniquely illuminated intensity measurements.

Certain aspects pertain to Fourier ptychographic tomographic methods. In some aspects, a Fourier ptychographic tomographic method receives a plurality of uniquely illuminated intensity measurements from an image sensor. The plurality of uniquely illuminated intensity measurements are based on light passing through a thick sample from plane wave illumination at different angles. The method also constructs three-dimensional tomographic data of the thick sample by iteratively determining three-dimensional tomographic data in the Fourier domain that is self-consistent with the uniquely illuminated intensity measurements. In one aspect, the three-dimensional tomographic data is constructed by updating voxels that intersect with overlapping surface areas in a three-dimensional sample spectrum in the Fourier domain with the uniquely illuminated intensity measurements. In one aspect, the Fourier ptychographic tomographic imaging method further comprises initializing a sample spectrum, and for each uniquely illuminated intensity measurement, (a) selecting a two-dimensional surface of the sample spectrum, (b) inverse Fourier transforming the two-dimensional surface, (c) imposing a magnitude constraint on the two-dimensional surface from (b), (d) Fourier transforming the two-dimensional surface from (c), and (e) replacing the voxels of one of the overlapping surface areas with data from one of the uniquely illuminated intensity measurements. In one aspect, the overlapping surface areas follow a circular path in the three-dimensional sample spectrum.

These and other features are described in more detail below with reference to the associated drawings.

DETAILED DESCRIPTION

Figure 1:
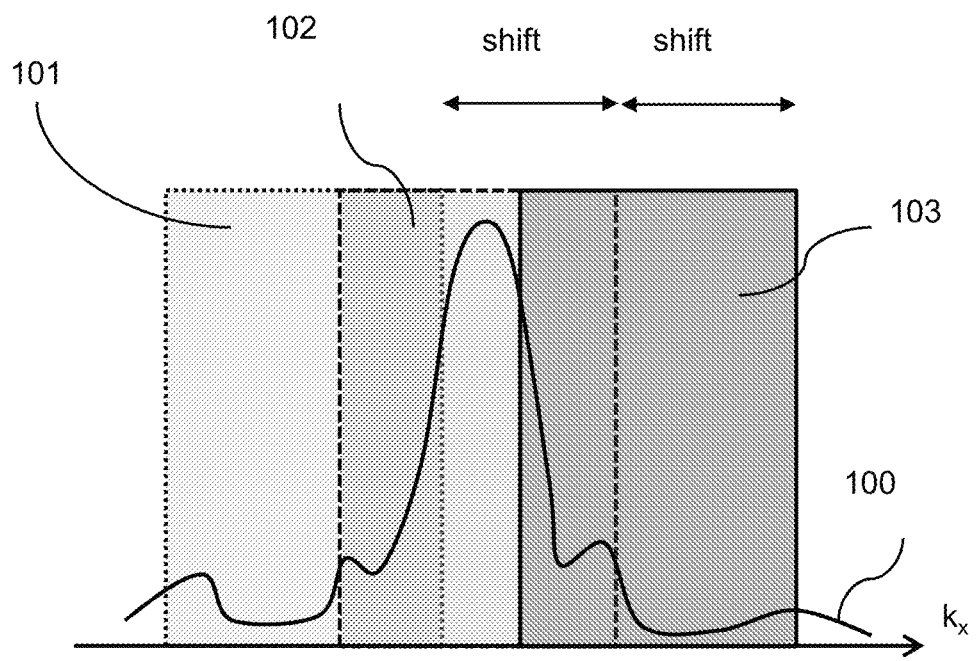
FIG. 1 is a schematic diagram illustrating a conventional FP technique used to image thin samples.

Certain embodiments will be described below with reference to the accompanying drawings. The features illustrated in the drawings may not be to scale.

I. Introduction to Fourier Ptychographic Tomography (FPT)

Certain aspects pertain to Fourier ptychographic tomography (FPT) systems and imaging methods that can reconstruct a high-resolution, volumetric representation of a thick, semi-transparent sample. As used herein, a thick sample generally refers to a sample that is at least 25 µm thick along the axial dimension, z. In general there are varying interpretations of the thickness at which a sample no longer obeys the thin sample approximation (i.e., the projection approximation). For example, in Lee et al., "Synthetic Fourier transform light scattering," Optics Express 21 (2013), which is hereby incorporated by reference for this discussion, the thin sample criterion is set at $t<\pi/k_z^{max}$, where $k_z^{max}$ is the maximum z wave vector at the image plane and t is the maximum thickness. For a standard microscope setup, this requires approximately that $t<2\lambda \approx 1.5$ µm, which is quite restrictive. Alternatively, in M. Vulovic et al., "When to use the projection assumption and the weak-phase object approximation in phase contrast cryo-EM," Ultramicroscopy 136 (2014), which is hereby incorporated by reference for this discussion, the maximum thickness that this thin sample approximation (i.e., projection approximation) holds is set at $t<<1/4\lambda k_{max}^2$. In practice, it has been found that conventional FP techniques, which assume that the thin sample approximation (that is, projection approximation) holds true, are successful up to a thickness of 25 µm, so this value will be used herein as the approximate transition from thin to thick sample.

FPT techniques are substantially different from conventional FP techniques in both the design of their system components and in their imaging operations. For example, FPT techniques require a much finer step size between angles of incident illumination during the image acquisition process than are required for FP techniques for the same fixed desired improvement in spatial (x, y) resolution. That is, FPT techniques generally require about half the step size that is required by FP techniques for the equivalent resolution improvement. For example, where a particular FP technique requires adjacent illumination angles to be within 1.7 degrees to 2.0 degrees from each other for a certain resolution improvement, an FPT technique with the same resolution improvement would require adjacent angles of incident illumination to be about 1.0 degrees from each other. To provide a finer step size, FPT systems use a denser array of illumination sources (i.e., LEDs) placed beneath the sample, as compared with FP systems. For example, certain FPT systems have n LED matrixes with at least three times as many LEDs over the same area as an LED matrix of an FP system capable of the same resolution improvement. In some cases, the FPT image acquisition process may involve capturing a larger number of sample images than would a conventional FP process. This may occur where the sample being imaged is exceptionally thick. For example, where a conventional FP acquisition process might capture 225 images to be able to reconstruct an improved resolution image of a thin sample of a certain spatial resolution, a FPT technique would require 1024 images to capture a volumetric representation of a very thick sample (>200 µm thick) with the same spatial resolution. Also, substantial differences exist between the image reconstruction process used in FPT imaging methods and the image reconstruction process used in conventional FP imaging methods as discussed below.

In short, conventional FP imaging methods consider the inverse problem of reconstructing a two-dimensional complex field emerging from the sample surface, U (x, y), from multiple measurements of its low-pass filtered intensity as expressed in Eqn. 1.

$$I_j(x, y) = |F[\tilde{U}(k_x - p_x^{(j)}, k_y - p_y^{(j)}) A(k_x, k_y)]|^2 \quad \text{(Eqn. 1)}$$

In Eqn. 1, $\tilde{U}(k_x, k_y)$ is the Fourier transform (i.e., spectrum) of the sample field U(x, y), $(p_x^{(j)}, p_y^{(j)})$ is the shift induced to the spectrum at the Fourier (i.e., lens aperture) plane induced by the $j^{th}$ LED, and A is the fixed aperture function. This inverse problem is typically solved in the two-dimensional Fourier plane using a nonlinear iterative solver. An example of a nonlinear iterative solver is discussed in G. Zheng, R. Horstmeyer, and. C. Yang, "Wide-field, high-resolution Fourier ptychographic microscopy," *Nature Photonics* (2013), which is hereby incorporated by references in its entirety. An example of a more recently introduced convex solver can be found in R. Horstmeyer, et al., "Solving ptychography with a convex relaxation," Horstmeyer, R., et al., Physics Optics (2014), which is hereby incorporated by reference in its entirety. In either solver approach, an initial estimate of the two-dimensional spectrum $\tilde{U}(k_x, k_y)$ is forced to obey all known constraints regarding the optical setup of the FP system.

FPT imaging methods, on the other hand, are based on an inverse problem in three-dimensional k-space in the Fourier domain. Instead of solving for $\tilde{U}(k_x, k_y)$ as done in FP techniques, the FPT reconstruction process solves for $\tilde{V}(k_x, k_y, k_z)$ in three-dimensional Fourier space where $k_z$ is the wavevector along the optical axis (i.e., the Fourier conjugate of variable z, the spatial dimension along the sample's depth axis).

The FP technique recovers a two-dimensional sample spectrum in $k_x$ and $k_y$ by updating two-dimensional regions using date from associated intensity images. To simplify certain examples, the sample is assumed to extend along one dimension and the FP technique is described in these examples as updating shifted window regions of the one-dimensional sample spectrum in $k_x$.

The FPT technique updates voxels along the surface area of a shifting spherical cap (bowl-shaped three-dimensional surface) in the Fourier domain with data from each uniquely illuminated intensity measurement. The FPT technique recovers a three-dimensional sample spectrum by iteratively updating voxels from different overlapping spherical cap regions with the n uniquely illuminated intensity measurements. Typically, the overlapping spherical cap regions represent data in the Fourier domain. For a typical update, a two-dimensional Fourier transform is applied to the data within each spherical cap, and then the estimated amplitudes from the current data are replaced with the measured amplitudes from the image associated with the particular position of the spherical cap. Furthermore, the position of each spherical cap is not arbitrary. Its center (i.e., the bottom of the upward facing bowl) is typically defined on a second spherical cap of equal size but with an opposite orientation with respect to the k axis (i.e., a downward-facing bowl, see plot on the right of FIG. 4).

For the purposes of simplifying certain examples, the spherical cap regions are reduced to arcs of circles and the three-dimensional spectrum is reduced to a two dimensional spectrum where the third dimension in $k_y$ is not discussed. In these examples, the FPT technique is described as updating these shifted arcs in the two-dimensional spectrum in $k_x$ and $k_z$. It would be understood that although the FPT technique is described in these examples as updating shifted arcs for simplicity, the FPT technique is actually updating three-dimensional surfaces in the three-dimensional spectrum in $k_x$, $k_y$, and $k_z$.

Figure 2:
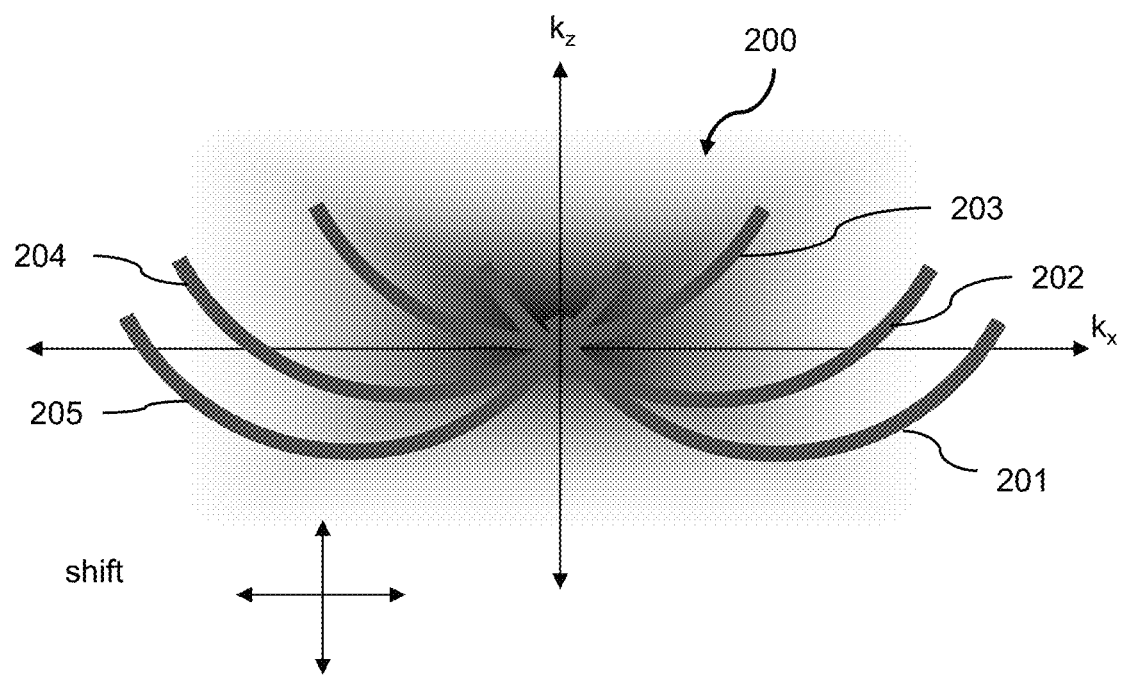
FIG. 2 is a schematic diagram illustrating the use of FPT techniques to image thick samples, according to embodiments.
Figure 3:
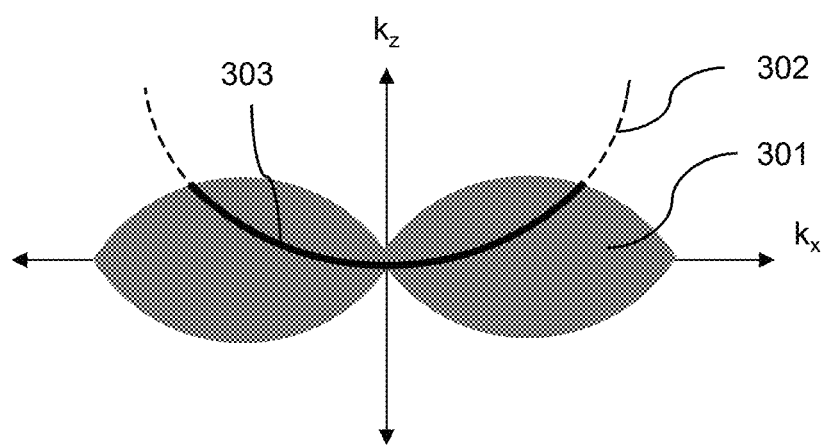
FIG. 3 is a schematic diagram illustrating the simplified output from the FP reconstruction depicted in FIG. 1 and the simplified output from the FPT process depicted in FIG. 2 according to embodiments.

The FPT reconstruction process recovers a three-dimensional sample spectrum by updating along the three-dimensional surface area of a spherical cap, i.e. a bowl-shaped surface in $k_x$, $k_y$, and $k_z$ with data from uniquely illuminated intensity images captured during an image acquisition process. In contrast, the FP reconstruction process recovers a two-dimensional sample spectrum by updating regions in a two-dimensional spectrum in $k_x$ and $k_y$. FIGS. 1, 2, and 3 are schematic diagrams illustrating the principle differences between a conventional FP reconstruction process and the FPT reconstruction process according to embodiments. For simplicity, these illustrated examples are made assuming the sample is extended along one dimension and the third dimension in $k_y$ (which is orthogonal to $k_x$ and $k_z$) is not shown.

FIG. 1 is a schematic diagram illustrating a conventional FP technique used to image thin samples. As discussed above, the FP technique recovers a two-dimensional sample spectrum by updating shifted windowed regions of the spectrum in $k_x$ and $k_y$ with data from each associated intensity images acquired by the image sensor. To simplify the illustrated example, FIG. 1 assumes the sample is extended along one dimension and a one-dimensional sample spectrum is recovered. In this example, the FP technique is described as updating shifted window regions of the one-dimensional sample spectrum in $k_x$. As discussed, the FP technique is illustrated as recovering a one-dimensional sample spectrum 100 by updating shifted windowed regions of the spectrum in $k_x$ with data from each associated image acquired. For simplicity, three windowed regions 101, 102, 103 are shown and the associated shift between the first region 101 and the adjacent second region 102 and the shift between the second region 102 and the adjacent third region 103 are shown. The illustration shows that the three shifted windowed regions 101, 102, 103 are updated with data from three acquired intensity images to recover the 1D sample spectrum 100. Each window region is updated with data from an image acquired while the sample is illuminated at a unique angle of incidence during the image acquisition process.

FIG. 2 is a schematic diagram illustrating the use of FPT techniques to image thick samples, according to embodiments. As discussed above, the FPT reconstructions process generally recovers a three-dimensional sample spectrum by updating voxels of shifted spherical cap regions in $k_x$, $k_y$, and $k_z$ with data from associated uniquely illumination intensity images acquired by the image sensor. To simplify the illustrated example, FIG. 2 assumes the sample is extended along one dimension and a two-dimensional (2D) sample spectrum is schematically represented as being recovered. Based on this assumption, the FPT technique is illustrated in FIG. 2 as recovering a two-dimensional sample spectrum 200 by updating shifted arcs in $k_x$ and $k_z$ with data from each associated image acquired. In this illustrated example, the FPT reconstruction process works within a 2D sample "potential spectrum" space, including data along $k_z$ as well as $k_x$. Instead of updating window regions as done in a FP reconstruction process illustrated in FIG. 1, the FPT reconstruction process updates arcs in the 2D sample "potential spectrum" space in FIG. 2. The FPT technique recovers a 2D sample spectrum in this example by updating curves in $k_x$ and $k_z$ with data from associated intensity images. For simplicity, five arcs 201, 202, 203, 204, and 205 are shown in FIG. 2 as updated with data from five acquired images to recover the 2D sample spectrum 200. More arcs can be used in other examples such as, for example, a number of arcs in the range from 225 to 1000. In the FPT reconstructions process, the values within each arc are updated with data from each associated image acquired.

Generally speaking, an FPT imaging method comprises an image acquisition process, a reconstruction process, and optionally a display process. As discussed above, the FPT reconstruction process recovers a three-dimensional sample spectrum in $k_x$, $k_y$, and $k_z$ by updating voxels in different locations, which for a given update are a specific surface in the three dimensional space, with data from associated intensity images acquired by the image sensor. In contrast, the FP reconstruction process recovers a two-dimensional sample spectrum in $k_x$ and $k_y$ by updating shifting two-dimensional regions with data from associated intensity images acquired by the image sensor. The output from the FPT imaging method is a three-dimensional reconstruction of the sample with improved lateral resolution (i.e., resolution along x and y) as well as depth information (i.e., resolution along z). In contrast, the output from the FP imaging method is two-dimensional sample reconstruction with improved lateral resolution but without depth information.

In the examples schematically shown in FIGS. 1 and 2, the simplified output from the FP reconstruction process is a one-dimensional sample spectrum and the simplified output from the FPT reconstruction process is a two-dimensional sample spectrum. FIG. 3 is a schematic diagram illustrating the simplified output from the FP reconstruction depicted in FIG. 1 and the simplified output from the FPT process depicted in FIG. 2 according to embodiments. In FIG. 3, the output from the FPT reconstruction process is depicted as two-dimensional region 301. In contrast, the output from the FP reconstruction process is depicted as a dotted line curve 302. A single image captured is depicted by the overlaying solid line curve 303.

The output of the FPT imaging method is a three-dimensional tomographic representation of the sample's index of refraction and absorption V(x, y, z). The tomographic representation includes data that can be used to generate two-dimensional sectional images of the thick sample at different depths, as well as three dimensional images of the thick sample. Using the FPT imaging method, the spatial resolution of V(x, y, z) can be improved by a significant factor along (x, y). The lateral spatial resolution improvement of the sample's index of refraction and absorption, V(x, y, z), provided by a FPT imaging system/method is a function of the physical characteristics of its optical system and variable illumination source of the FPT system. In examples of FPT systems where the optical system includes an imaging lens and the variable illumination source is an LED matrix, the lateral spatial resolution improvement is a function of the imaging lens numerical aperture $NA_0$ and the maximum illumination angle from the furthest off-axis LED, $NA_1$. In this case, the total effective NA of this FPT system is given as the sum, $NA_0+NA_1$, and the lateral spatial resolution improvement factor is $NA_0/(NA_0+NA_1)$. In one example described herein, the improvement factor of the described FPT system is approximately 2. This FPT system and other examples of FPT systems and their components are described in detail in Section II.

Unlike FP techniques, the output from the FPT imaging method, V(x, y, z), contains depth information about the sample along the optical axis (i.e., along z) of the FPT system. More importantly, FPT techniques are not based on the assumption that requires every sample be thin. Thus, FPT techniques can provide resolution-improved images for thick samples (≥25 um, no upper bound) as well as resolve depth information along the optical axis. It is also worth noting that the FPT reconstruction technique will work equally well for samples that are less than 25 p.m thick, and can provide a limited amount of axial information about such samples, unlike FP techniques.

Some conventional imaging systems have implemented tomographic reconstruction within a microscope are described in V. Laurer, "New approach to optical diffraction tomography yielding a vector equation of diffraction tomography and a novel tomographic microscope," J. of Microscopy 205 (2002), Choi et al., "Tomographic phase microscopy," Nature Methods 4, vol. 9 (2007), and M. Debailleul et al., "High-resolution three-dimensional tomographic diffractive microscopy of transparent inorganic and biological samples," Opt. Lett. 34 (2008). However, these conventional systems require simultaneous measurement of the amplitude and phase of the exiting field. This measurement requires a reference beam and highly coherent light i.e., a holography setup. Both of these system requirements are highly sensitive to small misalignments or motion, and require a large optical bench with many optical components. By only measuring amplitudes (i.e., within intensity images) and relying upon the FPT reconstruction process to recover the sample field's phase, FPT imaging techniques remove the need for all of this additional optical equipment, only requiring in one example, a conventional microscope outfitted with an LED matrix beneath the sample as discussed in Section II.

II. FPT Systems

Figure 4:
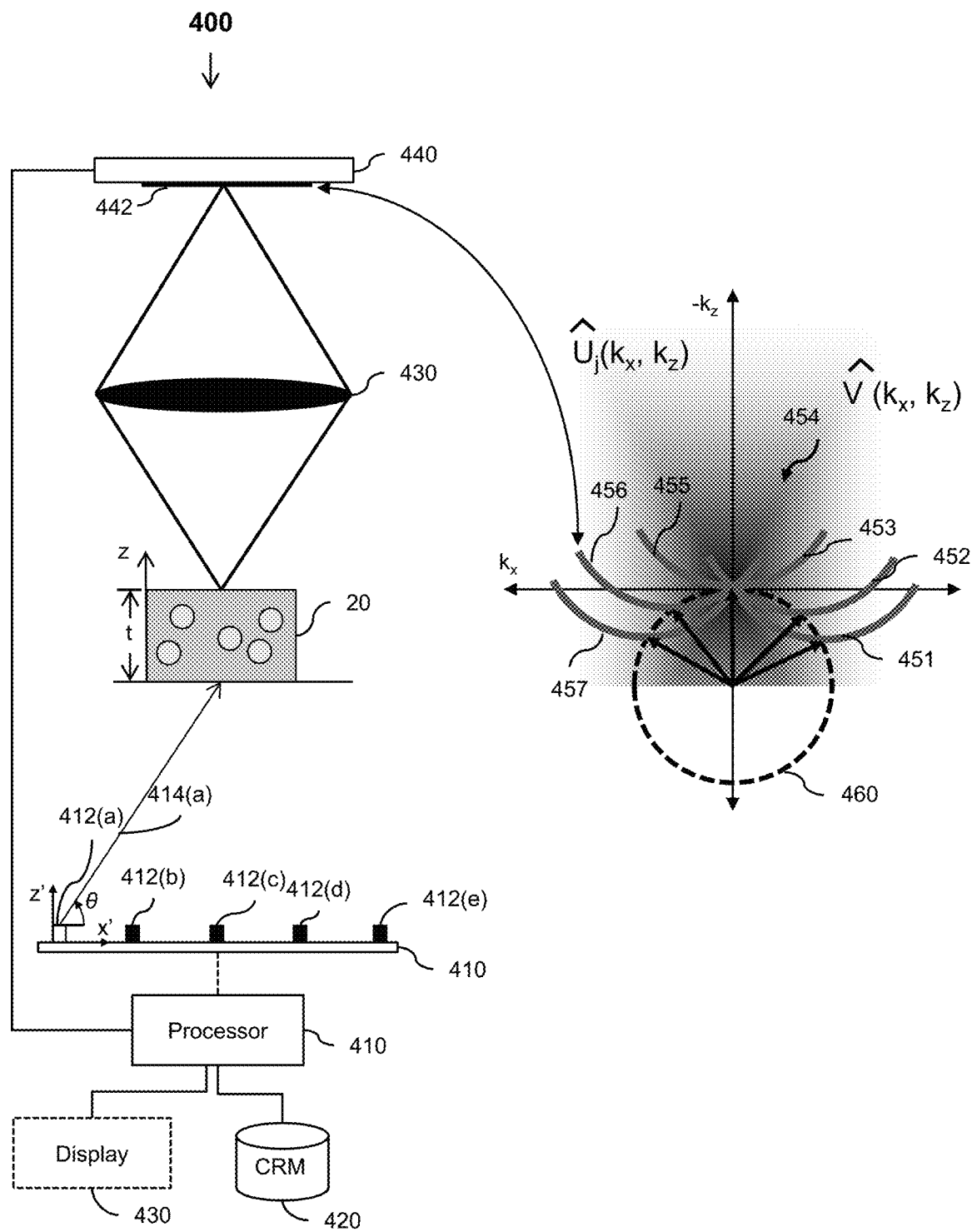
FIG. 4 is a schematic diagram of components of an FPT system and certain operations of an FPT imaging method performed by the FPT system, according to embodiments.

On the left, FIG. 4 includes a schematic diagram of components of an FPT system 400, according to embodiments. The schematic diagram also shows certain operations of an FPT imaging method performed by the FPT system 400. A thick sample 20 is shown provided to the FPT system 400 during an imaging acquisition process. The thick sample 20 has a thickness, t, in the z-direction along with z-axis. The FPT system 400 can perform the FPT imaging method described in detail in section III.

The FPT system 400 comprises a variable illumination source 410, an optical system 430, and an image sensor 440. The FPT system 400 also includes a processor 410, a computer readable medium (CRM) 420 in communication with the processor 410, and an optional (denoted by dotted line) display 430 in communication with the processor 410. The processor 410 is in communication with the image sensor 440 and optionally (denoted by dotted line) in communication with the variable illumination source 410. In one aspect, the processor 410, display 430 and CRM 420 are components of a computing device such as, for example, a smartphone, laptop, desktop, tablet, and the like. Although a single processor is shown, it would be understood that the FPT system 400 may include multiple processors performing the described functions of the illustrated processor. The electronic communication between components of FPT system 400 and between the FPT system 400 and other systems may be in wired and/or wireless form.

In FIG. 4, the variable illumination source 410 is configured to provide sequential plane wave illumination at n illumination angles at $(\theta_{x'}, \theta_{z'})$ to the thick sample 20. The variable illumination source 410 includes an x'-axis, z'-axis, and a y'-axis (not shown) orthogonal to the x'-axis and z'-axis. The variable illumination source 410 includes a two-dimensional matrix of discrete light elements (i.e. discrete illumination sources) in the direction of both the x'-axis and the y'-axis. For simplicity, the illustrated variable illumination source 410 is shown having five discrete light elements 412(a), 412(b), 412(c), 412(d), and 412(e) along the x' axis. It would be understood that the variable illumination source 410 includes discrete light elements along the y'-axis. Also, it would be understood that in other examples, the variable illumination source 410 includes more discrete light elements 412. For example, a variable illumination source 410 according to one aspect includes a 32×32 matrix of discrete light elements 412. For example, a variable illumination source 410 according to one aspect includes a 25×25 matrix of discrete light elements 412. As another example, a variable illumination source 410 according to one aspect includes a 100×100 matrix of discrete light elements 412. Some other examples include a one-dimensional matrix or two-dimensional matrix (e.g., 1×9 matrix, 3×6 matrix, 10×10 matrix, 15×15 matrix, 32×32 matrix, 100×100 matrix, 50×10 matrix, 20×60 matrix, or other matrix with two dimensions). Other dimensions of the matrix can be used.

The FPT system 400 is shown at a specific sample time during which a single light elements 412(a) is activated to provide plane wave illumination 414(a) from a single illumination angle, and a single intensity image 442 is captured. During an exemplary image acquisition process, the five discrete light elements 412(a), 412(b), 412(c), 412(d), and 412(e) are illuminated sequentially to provide five different plane waves and five intensity images are captured.

The optical system 430 comprises components configured to collect light passing through the thick sample 20 and propagate and/or focus the light to the image sensor 440. At each of n sample times, the image sensor 440 measures (e.g., records) an intensity distribution over an exposure time to capture a plurality of n intensity measurements (images) of the thick sample 20. Each intensity image is collected while the variable illumination source is illuminating a single discrete light element 412.

In some cases, the optical system 430 has a lens such that the light collected by the optical system 430 falls within a range of angles according to the numerical aperture (NA) of the lens. In one aspect, the optical system 430 includes a first optical element in a second optical element. The first optical element collects and filters light by accepting light within a range of angles according to its numerical aperture (NA) and the second optical element focuses the light to the image sensor. In one example, the first optical element may be a low-NA objective lens (e.g., a 2×, 0.08NA objective lens) of a conventional microscope. In another example, the first optical elements may be a high NA objective lens having an NA of about 0.40. In another example, the first optical elements may be a high NA objective lens having an NA in the range of about 0.40 to about 0.75. In another example, the first optical elements may be a high NA objective lens having an NA of about 0.60.

On the right, FIG. 4 includes a representation of the thick sample 20 in k-space of potential spectrum, $\tilde{V}$ ($k_x$, $k_z$), 454. The fields scattered from this thick sample, when illuminated sequentially by five different plane waves from individually illuminated light elements 412(a), 412(b), 412(c), 412(d), and 412(e), lie along spherical caps 451, 452, 453, 455, 456, and 457. For simplicity, FIG. 4 only illustrates spherical caps (arcs) to represent each field after it passes through the finite lens aperture function A ($k_x$, $k_z$). In the Fourier domain, the spherical caps (arcs) 451, 452, 453, 455, 456, and 457 are shifted along an illumination arc 460 as different light elements (e.g., LEDs) are turned on for sample illumination during the image acquisition process. The arrow between the intensity image 442 and the spherical cap 456 shows that the spherical cap 456 represents the potential spectrum values associated with intensity image 442. The magnitudes of the 1D Fourier transform of the values along the $j^{th}$ spherical cap (arc) correspond to the detected magnitudes within the $j^{th}$ image.

In FIG. 1, the processor 410 is in electronic communication with the image sensor 440 to receive signal(s) with image data corresponding to n intensity images. The image data may include, for example, intensity distributions, associated acquisition times, etc. The intensity images are of the thick sample 20. The processor 410 is in electronic communication with CRM 420 (e.g., memory) to be able to transmit signals with image data in order to store to and retrieve image data from the CRM 420. Optionally, the processor 410 is in electronic communication with a display 430 to be able to send display data and instructions for displaying images and other output, for example, to a user of the FPT system 400.

As denoted by a dotted line, the variable illumination source 410 is optionally in electronic communication with the processor 410 to send instructions for controlling variable illumination source 410. In certain aspects, the variable illumination source 410 the processor 410 sends control instructions to the variable illumination source 410 to synchronize the illumination of particular light elements 412 with the sample and exposure times of the image sensor 440.

The processor 410 receives instructions stored on the CRM 420 and executes those instructions to perform one or more functions of FPT system 400. In one example, the processor 410 executes instructions to perform operations of the FPT reconstruction process and/or other operations of the FET imaging method. In another example, the processor 410 executes instructions for sequentially illuminating discrete light elements 412 of the variable illumination source 410. In another example, the processor 410 executes instructions stored on the CRM 420 to perform one or more other functions of the system such as, for example, 1) interpreting image data from the sequence of acquired intensity images, 2) reconstructing a higher resolution image from the image data, and/or 3) displaying one or more images or other output from the FPT imaging method on the display 430.

The CRM (e.g., memory) 420 can store instructions for performing certain functions of the FPT system 400. These instructions are executable by the processor 420 or other processing components of the FPT system 400. The CRM 420 can also store the (lower resolution) intensity measurements and other data associated with the FPT imaging method.

The optional display 430 is in electronic communication with the processor 410 to receive display data for displaying on the display 430 to, for example, an operator of the FPT system 400. In one case, the optional display 430 is a color display or a black and white display. In one case, the optional display 430 is a two-dimensional display or a three-dimensional display. In one case, the optional display 430 is capable of displaying multiple views.

In one aspect, the FPT system 400 further comprises a receptacle for receiving and/or containing the thick sample 20. Generally, a working distance, $d_0$, refers to the distance between the thick sample 20 and a collecting optical element of the optical system 430.

A variable illumination source refers to a device that can be configured to provide plane wave illumination sequentially at n different illumination angles to thick sample being imaged by the FPT system. Each illumination angle corresponds to a location of the corresponding spherical cap data in the Fourier domain. In certain aspects, the variable illumination source is designed to provide illumination at illumination angles that generate a certain amount of overlapping of adjacent spherical caps in the Fourier domain.

The variable illumination source comprises a two-dimensional arrangement of discrete light elements. Each discrete light element can be activated to provide approximately plane wave illumination to the thick sample. Each discrete light element has at least one light source. In one aspect, each discrete light element includes a red light source, a green light source, and a blue light source. Although typically the light sources are coherent light sources, in one aspect sources with finite-sized active areas that emit incoherent light can be used. This light that is incoherent at the finite-sized source will form a partially coherent field upon propagation to the sample plane, and computational corrections can be applied to account for the partially coherent nature of the incident illumination. The two-dimensional arrangement of discrete light elements is one of a line grid, a rectangular grid, one or more concentric circles (rings), a hexagonal grid, and a curvilinear grid.

In some aspects, the variable illumination source provides visible light. An example of a variable illumination source that provides visible light is a light emitting diode (LED) matrix. In this example, each LED is a light element. Another example of a variable illumination source that provides visible light is a liquid crystal display (LCD).

In cases that use other forms of radiation, other sources of radiation may be used. For example, in embodiments that use X-ray radiation, the radiation source may comprise an X-ray tube and a metal target. As another example, in cases that use microwave radiation, the radiation source may comprise a vacuum tube. As another example, in embodiments that use acoustic radiation, the radiation source may be an acoustic actuator. As another example, in embodiments that use Terahertz radiation, the radiation source may be a Gunn diode. One skilled in the art would contemplate other sources of radiation. In one case that uses Terahertz radiation, the frequencies of the radiation provided by the illumination source may be in the range of about 0.3 to about 3 THz. In one case that uses microwave radiation, the frequencies of the radiation provided by the variable illumination source may be in the range of about 100 MHz to about 300 GHz. In one case that uses X-ray radiation, the wavelengths of the radiation provided by the variable illumination source may be in the range of about 0.01 nm to about 10 nm. In one case that uses acoustic radiation, the frequencies of the radiation provided by the variable illumination source may be in the range of about 10 Hz to about 100 MHz.

In one aspect, the light properties (e.g., wavelength, frequency, phase, amplitude, polarity, etc.) of the illumination are approximately uniform from each of the light elements sequentially illuminated during the image acquisition process. In other aspects, the light properties from the different light elements may vary at different sample times. For example, the variable illumination source may provide different wavelengths (e.g., three wavelengths $\lambda_1$, $\lambda_2$, and $\lambda_3$ corresponding to red, green, blue colors) of light at different sample times. In examples that use Terahertz radiation, the frequencies of the radiation provided by the variable illumination source may be in the range of about 0.3 to about 3 THz. In examples that use microwave radiation, the frequencies of the radiation provided by the variable illumination source may be in the range of about 100 MHz to about 300 GHz. In examples that use X-ray radiation, the wavelengths of the radiation provided by the variable illumination source may be in the range of about 0.01 nm to about 1nm. In examples that use acoustic radiation, the frequencies of the radiation provided by the variable illumination source may be in the range of about 10 Hz to about 100 MHz.

The variable illumination source includes discrete light elements that are sequentially illuminated at a sequence of image acquisition (sample) times. The order of the sequential illumination can be in illumination instructions provided to the variable illumination source. In one aspect, the order defines the illumination times of individual light elements in a two-dimensional matrix of discrete light elements.

In one example where the two-dimensional matrix of light elements is a rectangular array, a central light element is determined. This example, the illumination instructions instruct to illuminate the central light element first, then illuminate the 8 light elements surrounding the central light element going counterclockwise, then illuminate the 16 light elements surrounding the previous light elements going counterclockwise, and so on until the variable illumination source has provided illumination from the plurality of n illumination angles. In another example where the two-dimensional matrix of light elements is a polar matrix such as one or more concentric rings, the illumination instructions instructs to illuminate the light elements at smallest radius first (e.g., in clockwise, counterclockwise, or random order), then illuminate any light element at a larger radius, and so on until all the variable illumination source has provided illumination from the plurality of n illumination angles. In another example where the two-dimensional array of light elements is a rectangular or a polar array, a light element closest to the specimen may be determined. The illumination instructions instruct to illuminate the light element closest to the specimen, and then illuminate the light element next closest to the specimen, and then illuminate the light element next closest, and so on until the N light elements have been illuminated from the plurality of N illumination angles. In another example, the light elements may be illuminated in a random order. In another example, a sequential column by column order may be followed such as, for example, $(X_1, (X_1, Y_2), (X_1, Y_3), \ldots (X_1, Y_n), (X_2, Y_1), (X_1, Y_2), (X_1, Y_3), \ldots (X_2, Y_n), \ldots (X_m, Y_n)$. Alternatively, a row by row order may be followed.

A thick sample being imaged by an FPT system described herein can be comprised of one or more objects and/or one or more portions of an object. Each object may be, for example, a biological entity, an inorganic entity, etc. Some examples of biological entities that can be imaged include whole cells, cell components, microorganisms such as bacteria or viruses, and cell components such as proteins. An example of an inorganic entity that can be imaged is a semiconductor wafer. In certain aspects, a thick and/or non-transparent sample can be imaged by certain Fourier ptychographic imaging systems described herein. The sample may be provided in a medium such as a liquid.

In certain FPT systems described herein, the image sensor (e.g., image sensor 440 in FIG. 4) is configured to acquire n uniquely illuminated intensity images of a thick sample by measuring over an exposure time an intensity distribution of light incident on the sensing area of the image sensor. At each sample time, the image sensor acquires a single intensity image while the variable illumination source provides plane wave illumination from a single illumination angle. Over the course of the image acquisition process, the image sensor sequentially acquires n uniquely illuminated intensity images corresponding to the n illumination angles. If visible light is being measured, the image sensor may be in the form of a charge coupled device (CCD), a CMOS imaging sensor, an avalanche photo-diode (APD) array, a photo-diode (PD) array, a photomultiplier tube (PMT) array, or like device. If using THz radiation, the image sensor may be, for example, an imaging bolometer. If using microwave radiation, the image sensor may be, for example, an antenna. If X-ray radiation is used, the image sensor may be, for example, an x-ray sensitive CCD. If acoustic radiation is used, the image sensor may be, for example, a piezoelectric transducer array. These examples of image sensors and others are commercially available. In some cases, the image sensor may be a color detector e.g. an RGB detector. In other cases, the image sensor need not be a color detector. In certain cases, the image sensor may be a monochromatic detector.

In certain aspects, the image sensor may have discrete elements (e.g., pixels). The discrete detecting elements may be of any suitable size (e.g., 1-10 microns) and any suitable shape (e.g., circular, rectangular, square, etc.). For example, a CMOS or CCD element may be 1-10 microns and an APD or PMT light detecting element may be as large as 1-4 mm. In one example, the radiation detecting element is a square pixel having a size of 5.5 um.

An image acquisition (sample) time refers to a time during the exposure time of the image sensor 430 during which the image sensor 430 measures an intensity distribution to capture an intensity image. During each image measurement process, the image sensor captures n intensity images (e.g., n=1, 2, 5, 10, 20, 30, 50, 100, 1000, 10000, etc.). In some cases, the image sensor has a sampling rate. In one case, the sampling rates may be in the range of 0.1 to 1000 frames per second.

During the image acquisition process, the image sensor 430 captures n intensity images. The image sensor 430 may also generate other image data such as the sample times and other related sample data. Each of the plurality of n intensity images captured by the image sensor is associated with a spherical region in Fourier space. In Fourier space, neighboring spherical regions may share an overlapping region over which they sample the same Fourier domain data. In certain aspects, the variable illumination source is configured to provide illumination at a plurality of illumination angles that are spaced to provide a certain amount of overlap in the adjacent spherical regions in the Fourier domain data. In one case, the variable illumination source is configured to provide illumination at a plurality of illumination angles to generate an overlapping area in the Fourier domain data in the range of about 2% to about 99.5% of the area of one of the regions. In another case, the overlapping area between neighboring regions may have an area that is in the range of about 65% to about 75% the area of one of the regions. In another case, the overlapping area between neighboring regions may have an area that is about 65% of the area of one of the regions. In another case, the overlapping area between neighboring regions may have an area that is about 70% of the area of one of the regions. In another case, the overlapping area between neighboring regions may have an area that is about 75% of the area of one of the regions.

Figure 5:
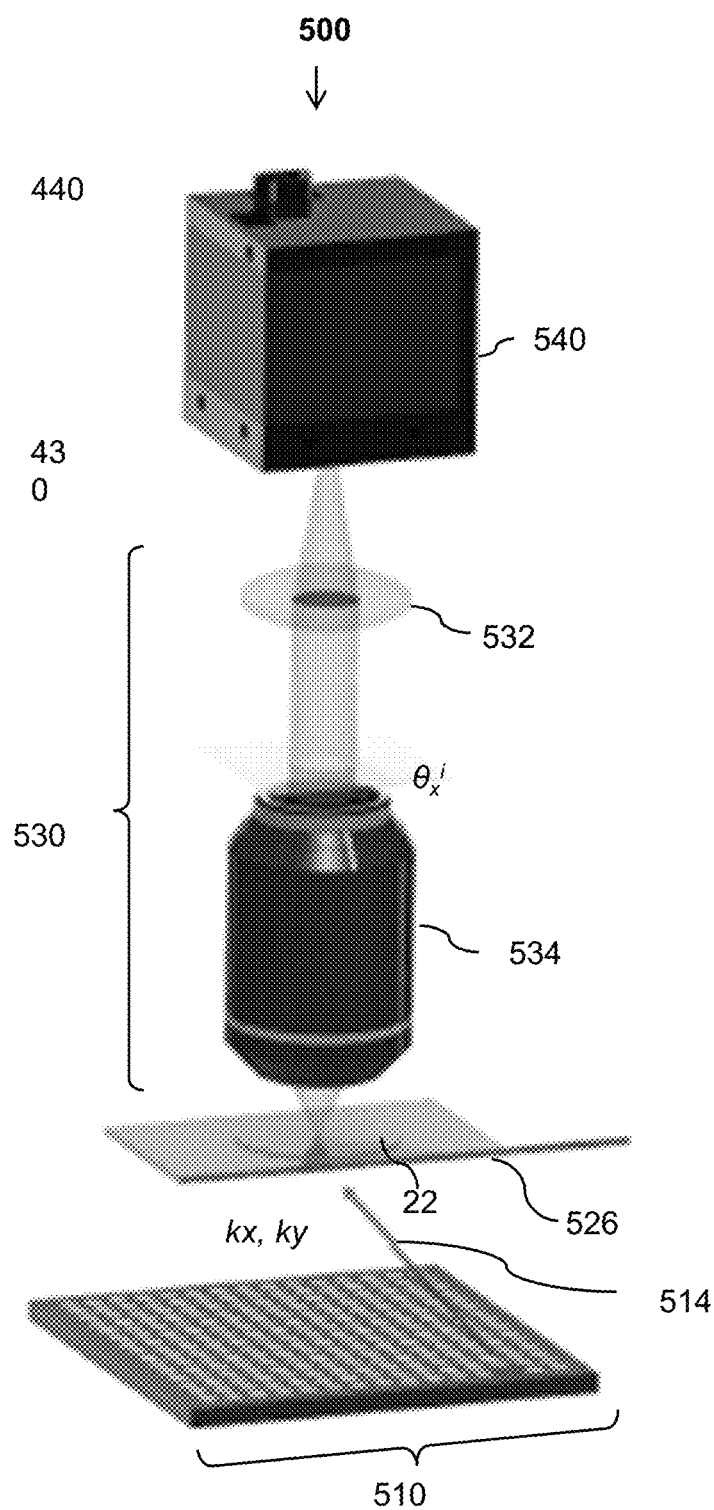
FIG. 5 is an orthogonal view of components of a FPT system, according to certain embodiments.

FIG. 5 is an orthogonal view of components of a FPT system 500, according to certain embodiments. Some of the components of FPT system 500 are similar to those described with respect to FIG. 4. The FPT system 500 comprises a variable illumination source 510, an optical system 530, and an image sensor 540. In this illustration, the optical system 530 includes an objective 534 (e.g., microscope objective) and a tube lens 532. The objective 534 is the first optical element of the optical system 430 and is a collection optical element. In one aspect, the objective 532 has a high NA in the range of about 0.50 to about 0.75. A thick sample 22 is shown on a specimen surface 526 as provided to the FPT device 500.

In FIG. 5, the variable illumination source 510 is in the form of an LED matrix having a rectangular grid arrangement (15×15 square array) of 225 equi-spaced LEDs 512. In other examples, the variable illumination source 510 has a larger number of LEDs 512. In one example, the variable the variable illumination source 510 has a rectangular grid arrangement (30×30 square array) of 900 equi-spaced LEDs 512. In another example, the variable the variable illumination source 510 has a rectangular grid arrangement of 40×40=1600 equi-spaced LEDs 512.

During an image acquisition operation, n different LEDs 512 are activated sequentially to provide plane wave illumination at n different illumination angles. In one example image acquisition process, the thick sample 22 is iluminated from 225 different illumination angles by the 225 different LEDs of the variable illumination source 510 in the form of the LED matrix. The objective lens 534 collects light passing through the thick sample 20 and filters the light based on the acceptance angle of its NA. The tube lens 532 focuses the filtered light to the image sensor 540. The image sensor 540 captures 225 intensity images while the variable illumination source 510 illuminates the sample 22 by 225 different illumination angles.

III. FPT Imaging Methods

According to certain aspects, an FPT imaging method comprises an image acquisition (data collection) process, an FPT reconstruction process, and optionally a display process. In the image acquisition process, the FPT imaging method acquires n uniquely illuminated images, following Eqn. 1. During the image acquisition process, the sample is sequentially illuminated from n different illumination angles using the variable illumination source (e.g. LED matrix). An optical system collects light passing through the specimen and focuses the light to an image sensor. As the sample is sequentially illuminated, the image sensor captures a sequence of n uniquely illuminated images corresponding to the n illumination angles. The output of the imaging acquisition process is n uniquely illuminated images. With the data from each uniquely illuminated image, the FPT reconstruction process updates the voxels that intersect with the surface area of a spherical cap in the three-dimensional potential spectrum in $k_x$, $k_y$, and $k_z$ for the particular sample. The FPT reconstruction process recovers a three-dimensional potential spectrum for the sample by updating each of n spherical cap surface areas in the three-dimensional spectrum in $k_x$, $k_y$, and $k_z$ where each spherical cap surface area corresponds to data from one of the n uniquely illuminated images acquired by the image sensor during the image acquisition process. For the $j^{th}$ image of the sample under illumination from LED j, which shines light with a wavevector $(k_x(j), k_y(j), k_z(j))$ onto the sample, the jth spherical cap surface area associated with this $j^{th}$ image will be centered in the three-dimensional spectrum at the voxel $k_x(j)$, $k_y(j)$, $k_z(j)$. Note that since for any coherent field, $k_z(j)=\sqrt{k_0^2-k_x(j)^2-k_y(j)^2}$, (i.e., $k_z$ is a deterministic function of $k_x$ and $k_y$), the locations that each spherical cap surface area will be centered at will fall on a second "illumination bowl," which constrains the voxels within the potential spectrum that can be updated to a finite volume, otherwise referred to as a 3D bandpass volume. The FPT reconstruction process recovers a three-dimensional sample spectrum by updating the voxels that intersect with the surface area of a spherical cap in the three-dimensional spectrum in $k_x$, $k_y$, and $k_z$ with data from each associated intensity image acquired by the image sensor.

Figure 6A:
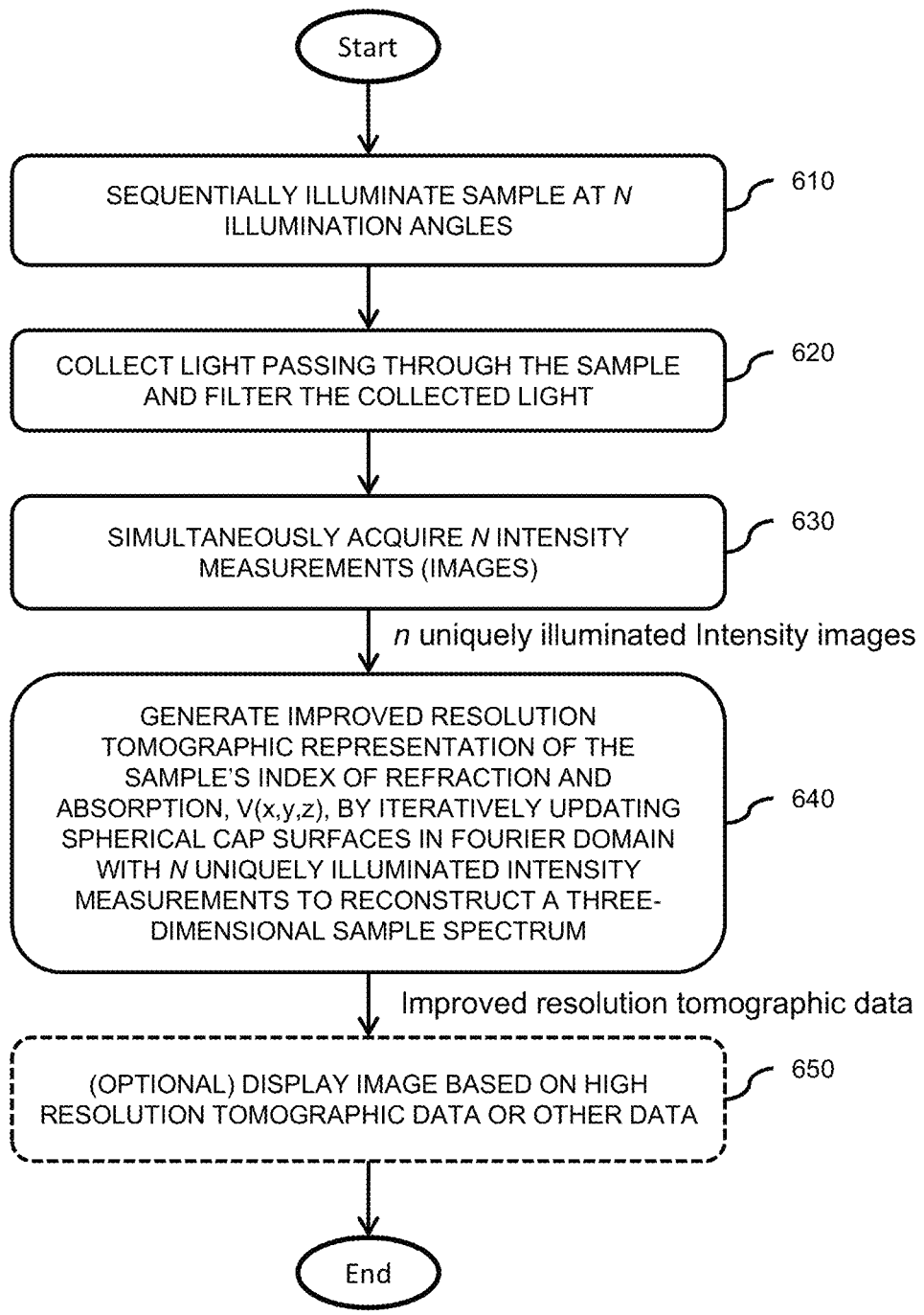
FIG. 6A is a flowchart of a single run of an FPT imaging method used by an FPT system such as the FPT systems described with respect to FIGS. 4 and/or 5, according to certain embodiments.
Figure 6B:
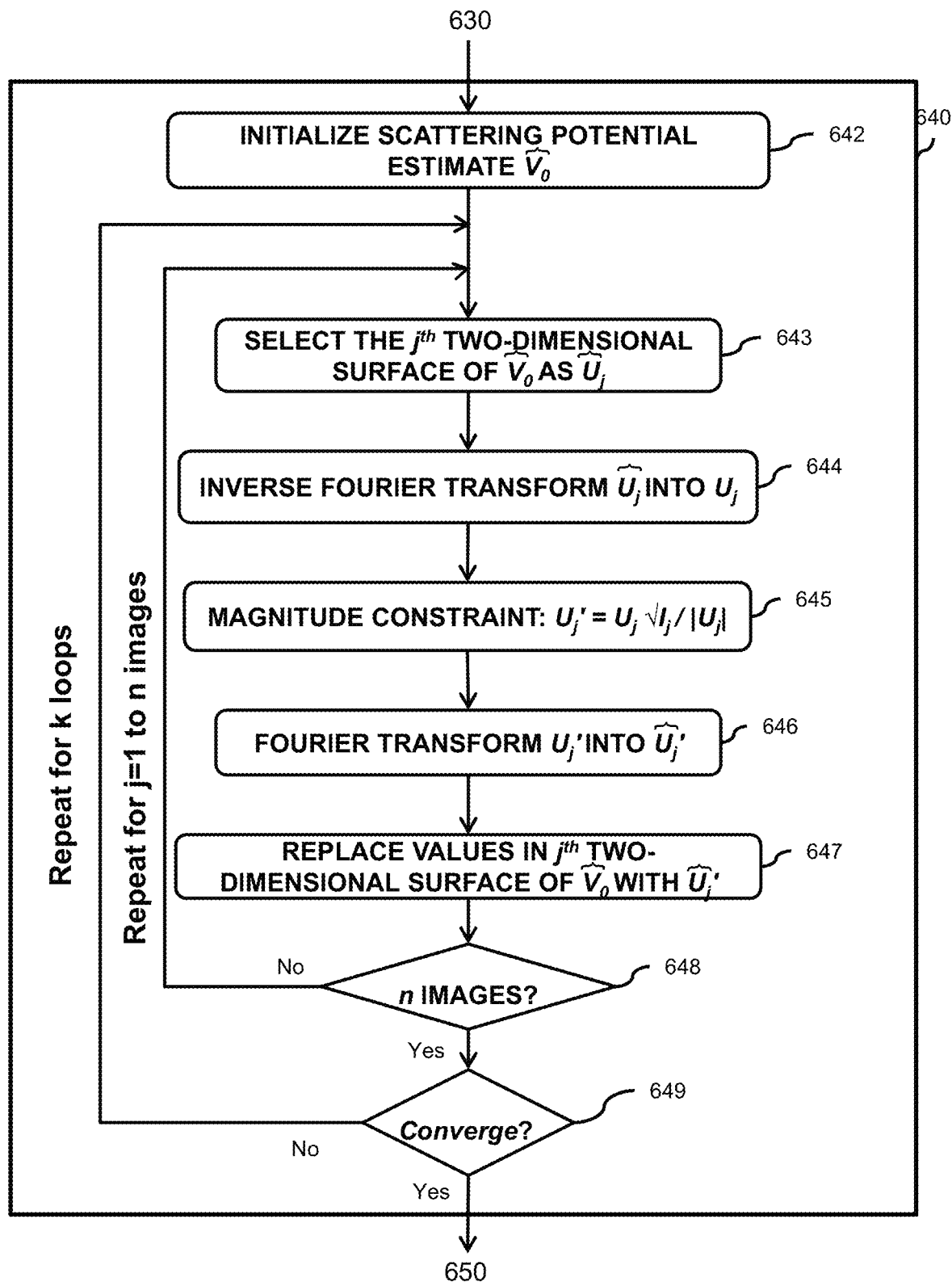
FIG. 6B is a flowchart depicting the FPT reconstruction process of the FPT method described with respect to FIG. 6A, according to certain embodiments.

FIG. 6A is a flowchart of a single run of an FPT imaging method used by an FPT system such as the FPT systems described with respect to FIGS. 4 and/or 5, according to certain embodiments. In this FPT imaging method, the image acquisition process includes operations 610, 620, and 630. The output of the imaging acquisition process is n uniquely illuminated images. In this FPT imaging method, the FPT reconstruction process includes operation 640 and the optional display process includes operation 650. FIG. 6B is a flowchart depicting the doubly iterative sub-operations of operation 640, the FPT reconstruction process of the FPT method described with respect to the flowchart shown in FIG. 6A, according to certain embodiments. The sub-operations depicted in the flowchart shown in FIG. 6A are performed by one or more processors of the FPT system.

The FPT imaging method starts at operation 610 by using a variable illumination source to sequentially provide plane wave illumination at n different angles to the sample being imaged. During this operation, the variable illumination source provides plane wave illumination sequentially to the sample at n illumination angles, $(\theta_x^i, \theta_y^i)$, i=1...n. The variable illumination source provides plane wave illumination at each incidence angle over the exposure time during which the image sensor acquires a single intensity image associated with that incidence angle. The intensity image is captured by measuring the intensity distribution over the active sensing area of the image sensor during the exposure time. The sequencing of the plane wave illumination angles by the variable illumination source and the sampling of the image sensor are timed (e.g. synchronized) so that the image sensor can acquire n uniquely illuminated images corresponding to the n illumination angles, $(\theta_x^i, \theta_y^i)$, $i=1 \ldots n$. The wave vector in x and y directions is denoted as $k_{xi}$ and $k_{yi}$ in certain examples.

In one aspect, the variable illumination source provides illumination at different wavelengths sequentially. In a color imaging example, the variable illumination source sequentially generates three wavelengths $\lambda_1$, $\lambda_2$, and $\lambda_3$ corresponding to red, green, blue colors (i.e. RGB), respectively.

At operation 620, an optical system of the FPT system collects light passing through the sample and filters the collected light. In one aspect, the optical system includes a first optical element and a second optical element. The first optical element collects and filters light by accepting light within a range of angles according to its numerical aperture (NA) and the second optical element focuses the light to the image sensor. In one example, the first optical element may be a low-NA objective lens (e.g., a 2×, 0.08NA objective lens) of a conventional microscope.

According to certain aspects, the image sensor measures intensity distribution data during an exposure time to acquire each raw intensity image associated with a unique illumination angle during the image acquisition process. At operation 630, the image sensor simultaneously acquires n intensity images while the variable illumination source sequences through plane wave illumination at n illumination angles, $(\theta_x^i, \theta_y^i)$, $i=1 \ldots n$. During the image acquisition process, the image sensor receives light passing through the sample from the optical system of the FPT system. At each sample time of n sample times, $t_{i=1 \text{ to } n}$, the image sensor measures intensity distribution data during an exposure time to acquire a low-resolution (raw) intensity image. During the image acquisition process, the image sensor acquires a plurality of n low-resolution intensity images at n sample times, $t_{i=1 \text{ to } n}$ that are associated with n different angles of illumination, $(\theta_x^i, \theta_y^i)$, $i=1 \ldots n$.

In one aspect, the FPT system may acquire more than n uniquely illuminated images during the image acquisition process and the FPT imaging method downselects (omits certain images) to the n images that will be used in the FPT reconstruction process. For example, the FPT imaging method may omit images that have an average intensity that is below a certain minimum value.

At operation 640, an improved resolution three-dimensional tomographic representation of the sample's index of refraction and absorption, V(x,y,z), is generated. During operation 640, the FPT reconstruction process recovers an improved resolution three-dimensional sample spectrum by iteratively updating voxels that intersect with the surface area of n different three-dimensional spherical cap regions in the Fourier domain, with n uniquely illuminated intensity measurements. In some cases, the reconstruction process iterates to determine the three-dimensional sample spectrum that is self-consistent with the n uniquely illuminated intensity measurements. Further details regarding operation 640 are provided with reference to FIG. 6B below. The FPT reconstruction process works within a three-dimensional sample "potential spectrum" space, including data along k as well as $k_x$ and $k_y$. The FPT reconstruction process updates voxels that intersect with the surface area of a spherical cap in the three-dimensional "potential spectrum" space.

At optional operation 650, the FPT system displays an image associated with the improved resolution tomographic data or other data associated with the FPT imaging method. In one aspect, the FPT system includes a display. The display is in electrical communication with the processor of the FPT system to receive display data from the processor for displaying images and other data to the display.

FPT Reconstruction Process

First, an initial estimate of the sample's scattering potential is described in T. D. Gerke and R. Piestun, "Aperiodic volume optics," Nature Photonics (2010) and Born, M. & Wolf, E. Principles of Optics $7^{th}$ edn., Cambridge Univ. Press, (1999); both of which are hereby incorporated by reference for this description. One example form of the sample's scattering potential is given as:

$$V(x, y, z) = \Delta n^2(x, y, z, \lambda)/\lambda^2 \quad \text{(Eqn. 2)}$$

Where $n(x, y, z, \lambda)$ is the sample's complex index of refraction. Another example of the sample's scattering potential is given as:

$$V(x, y, z) = \Delta n(x, y, z, \lambda)/\lambda^2 - ia(x, y, z, \lambda) \quad \text{(Eqn. 3)}$$

Here a is the sample's absorption and n is the real part of the index. The alternative form is described in Laurer, "New approach to optical diffraction tomography yielding a vector equation of diffraction tomography and a novel tomographic microscope," J. of Microscopy 205 (2002), which is hereby incorporated by reference for this description.

Using either form for the initial estimate, when the sample is illuminated with a plane wave, the resulting field at a large distance from the scatterer sample is determined by first computing the scattering potential given by:

$$\tilde{V}(k_x, k_y, k_z) = F_{3D}[V(x, y, z)] \quad \text{(Eqn. 4)}$$

Here $F_{3D}$ denotes a three-dimensional Fourier transform.

Under the first Born approximation, the scatterer field $\tilde{U}_j(k_x, k_y)$ when the thick sample defined by V under illumination from the $j^{th}$ LED is given by:

$$\tilde{U}_j(k_x, k_y) = \tilde{V}(k_x - p_x^{(j)}, k_y - p_y^{(j)}, k_z - p_z^{(j)}) \quad \text{(Eqn. 5)}$$

Here, $(p_x^{(j)}, p_y^{(j)}, p_z^{(j)})$ are the three wavevectors of the illuminating plane wave from the $j^{th}$ LED. Since the three wavevectors satisfy the relation, $p_z^{(j)} = \sqrt{(2\pi/\lambda)^2 - p_x^{(j)2} - p_y^{(j)2}}$, their values fall on a spherical shell. Likewise, the values $(k_x, k_y, k_z)$ also must obey the relation $(2\pi/\lambda)^2 = k_x^2 + k_y^2 + k_z^2$, so their values also lie on a spherical shell in this three dimensional k-space. A diagram of this sphere shell is shown in Fig. is shown in FIG. 4, which is shown in two dimensions for simplicity. The first Born approximation is discussed in T. D. Gerke and R. Piestun, "Aperiodic volume optics," Nature Photonics (2010), and Born, M. & Wolf, E. Principles of Optics 7th edn, Cambridge Univ. Press. (1999), which are both hereby incorporated by reference for this discussion.

Like FP, the optical system aperture modulates each of these scattered fields before the fields propagate to the system image plane, where the image sensor only measures the field's intensity. Thus Eqn. 1 can be rewritten to express each detected image in this new three-dimensional k-space as:

$$I_j(x, y) = |F[\tilde{V}(k_x - p_x^{(j)}, k_y - p_y^{(j)}, k_z - p_z^{(j)}) A(k_x, k_y)]|^2 \quad \text{(Eqn. 6)}$$

The main goal of the FPT reconstruction process is to construct $\tilde{V}(k_x, k_y, k_z)$ based on the series (sequence) of raw intensity images, $I_j(x, y)$ collected by the image sensor. In one aspect, the inverse problem is solved in the same way as the alternating projections (AP) phase retrieval strategy is used to solve the inverse problem in the FP reconstruction process as outlined in G. Zheng, R. Horstmeyer, and C. Yang, "'Wide-field, high-resolution Fourier ptychographic microscopy," *Nature Photonics* (2013), which is hereby incorporated by reference in its entirety. In another aspect, a more advanced convex approach is used to solve the inverse problem in the FPT reconstruction process, extending to three dimensions the approach described in R. Horstmeyer, et al., "Solving ptychography with a convex relaxation," *Physics Optics* (2014), which is hereby incorporated by reference.

FIG. 6B is a flowchart of an example of operations in an FPT reconstruction process according to embodiments. These operations depicted in the flowchart shown in FIG. 6B are performed by one or more processors of the FPT system. The FPT reconstruction process described with respect to FIG. 6B is an example of sub-operations that take place in the operation 640 of the FPT method described with reference to FIG. 6A.

In FIG. 6B, the FPT reconstruction process of the FPT imaging method includes two iteration loops. The inner iteration loop repeats operations 643, 644, 645, 646 and 647 for j=1 for the n uniquely illuminated intensity images that result from the image acquisition process of the FPT imaging method described with respect to FIG. 6A. The outer iteration loop repeats operations 643, 644, 645, 646, 647 and 648 until the FPT reconstruction process converges at which point the FPT imaging method returns to optional operation 650 or ends at operation 660 if optional operation 650 is not performed.

At sub-operation 642, the FPT reconstruction process initializes the sample's scattering potential spectrum estimate, $\tilde{V}_0 (k_x, k_y, k_z)$. In one example, a single image captured by the image sensor during illumination by a central LED of the LED matrix or another single illuminated LED is used to generate the initialize potential estimate, $\tilde{V}_0 (k_x, k_y, k_z)$. The Fourier transform of this single image can be stacked on itself to form a data cube generating the volume data for $\tilde{V}_0$ which is homogenous along the z-direction (e.g., 10 slices forming data cube). In another example, the $\tilde{V}_0$ can be initialized with all zeros. At the first iteration of the inner iteration loop, j is set to 1.

At sub-operation 643, the FPT reconstruction process selects the $j^{th}$ two-dimensional surface of $\tilde{V}_0 (k_x, k_y, k_z)$, which corresponds to the spectrum $\tilde{U}_j (k_x, k_y)$, following Eqn. 5, modulated by the finite aperture $A(k_x, k_y)$. As described above, this selection is performed by identifying the voxels that intersect with the $j^{th}$ spherical cap surface area, and then using these voxels to form each pixel within the spectrum $\tilde{U}_j (k_x, k_y)$. The center of the $j^{th}$ spherical cap surface area will be at voxel location $(k_x(j), k_y(j), k_z(j))$, where $(k_x(j), k_y(j), k_z(j))$ denotes the three dimensional wavevector of the light emitted from LED j at the sample plane. Likewise the lateral extent of the $j^{th}$ spherical cap surface area is given by the numerical aperture of the finite aperture $A(k_x, k_y)$. Once the wavevector $(k_x(j), k_y(j), k_z(j))$ and the numerical aperture of $A(k_x, k_y)$ are used to fix the location and size of the $j^{th}$ spherical cap surface area, one may then identify the potential spectrum voxels that intersect with this surface area, and subsequently form the pixels within the spectrum $\tilde{U}_j(k_x, k_y)$. The spectrum $\tilde{U}_j(k_x, k_y)$ is associated with the $j^{th}$ intensity measurement corresponding to a unique illumination angle. For example, at the first iteration of the inner loop where j=1, the FPT reconstruction process selects the $1^{st}$ two-dimensional surface of $\tilde{V}_0 (k_x, k_y, k_z)$, which corresponds to the spectrum $\tilde{U}_1 (k_x, k_y)$, associated with the $1^{st}$ intensity image captured by the imaging sensor.

At sub-operation 644, the FPT reconstruction process applies a two-dimensional inverse Fourier transform to $\tilde{U}_j (k_x, k_y)$, to form $U_j(x, y)$, which is an estimate of the field that results at the image plane when the sample is illuminated with LED j.

At sub-operation 645, the FPT reconstruction process applies a magnitude constraint to $U_j$ to generate $U'_j$ using Eqn. 7.

$$U'_j = U_j \frac{\sqrt{I_j}}{|U_j|}. \tag{Eqn. 7}$$

where $|U_j|$ is the magnitude of $U_j$.

At sub-operation 646, the FPT reconstruction process applies a two-dimensional Fourier transform to $U_j'(x, y)$ to form the updated spectrum $\tilde{U}_j'(k_x, k_y)$. At sub-operation 646, the FPT reconstruction process applies a two-dimensional Fourier transform to the values of the $j^{th}$ optical field at the image plane, which forms a scaled version of the values of the potential spectrum that lie along the $j^{th}$ corresponding spherical cap "bowl" shaped region.

At sub-operation 647, the FPT reconstruction process replaces values in the voxels that intersect with the $j^{th}$ spherical cap bowl region (that is, the $j^{th}$ two-dimensional surface denoted mathematically by $\tilde{V} (k_x-p_x^{(j)}, k_y-p_y^{(j)}, k_z-p_z^{(j)}) A(k_x, k_y)$, with the values from $\tilde{U}_j'(k_x, k_y)$. Note that these voxels originally contained the spectrum values $\tilde{U}_j(k_x, k_y)$, and in this step these original spectrum values are replaced with the undated spectrum values $\tilde{U}_j'(k_x, k_y)$. In other words, the FPT reconstruction process first replaces the magnitudes of the resulting two dimensional Fourier transform from operation 646, $\tilde{U}_j(k_x, k_y)$, with the measured magnitudes from the $j^{th}$ image, $\sqrt{I_j(x,y)}$, leaving the phase unchanged. This forms an updated image plane field, $U_j'(x, y)$. Then, the FPT reconstruction process applies an inverse two dimensional Fourier transform to the result of this magnitude replacement, $U_j'(x, y)$, and places the values of the resulting inverse two dimensional Fourier transfom, $\tilde{U}_j'(k_x, k_y)$, along the original spherical cap "bowl" shaped region from which they originated from within the scattering spectrum $\tilde{V}_0 (k_x, k_y, k_z)$.

At sub-operation 647, the FPT reconstruction process determines whether sub-operation 643, 644, 645, 646, and 647 have iterated through all n images associated with the n illumination angles. If sub-operations 643, 644, 645, 646, and 647 have not iterated through all n images, then these sub-operations are repeated for the next image by incrementing the iteration step (j=j+1) and the FPT method returns to step 643. For example, at the second iteration of the inner loop (j=2), the FPT reconstruction process moves to a second two-dimensional surface within the scattering spectrum $\tilde{V}_0 (k_x, k_y, k_z)$, which corresponds to the spectrum of the section image $\tilde{U}_2 (k_x, k_y)$. The FPT reconstruction process repeats the process of selecting, Fourier transforming, enforcing known magnitudes and replacing for the region of $\tilde{U}_2 (k_x, k_y)$, as well as all $\tilde{U}_j (k_x, k_y)$, for j=1 to n, where n is the number of uniquely illuminated images captured during the image acquisition process.

At sub-operation 648, if sub-operations 643, 644, 645, 646, and 647 have iterated through all n uniquely illuminated images, then the FPT reconstruction process goes to sub-operation 649. Through the iterations, the spherical cap regions are shifted along a circle in the Fourier domain.

At sub-operation 649, the reconstruction process determines whether the improved resolution solution of the three-dimensional tomographic data has converged. In some cases, the processor determines whether the improved resolution solution has converged to a self-consistent solution. A self-consistent solution occurs when the processor determines a three-dimensional sample spectrum that is consistent with the n uniquely illuminated intensity measurements. In one case, the processor compares the solution of the previous iteration or initial guess to the present solution, and if the difference is less than a certain value (e.g., less than 10% in one example, less than 1% in one example, less than 5% in one example, etc.) the solution may have converged to a self-consistent solution. If the processor determines that the solution has not converged, then the FPT reconstruction process returns to sub-operation 643 to return to the region corresponding to $\tilde{U}_1 (k_x, k_y)$ again, and the FPT reconstruction process repeats the entire n-image inner loop k times until convergence.

Each of the n uniquely illuminated intensity images from the image acquisition process will be used in the FPT reconstruction process to update voxels along the surface area of a three-dimensional spherical cap in three-dimensional Fourier space. In certain aspects, the FPT reconstruction process provides that adjacent spherical cap regions within the three-dimensional space, for example, the regions corresponding to $\tilde{U}_1 (k_x, k_y)$ and $\tilde{U}_2 (k_x, k_y)$, overlap by a certain amount that so that the three-dimensional phase retrieval process will converge to an accurate estimate of the original scattering potential, $\tilde{V} (k_x, k_y, k_z)$. In one example, the overlap is greater than 60%. According to this example with adjacent regions $\tilde{U}_1 (k_x, k_y)$ and $\tilde{U}_2 (k_x, k_y)$, 60% of the pixels selected from the first region must also be selected for update for the second region. This is typically the amount of overlap required in two dimensions for the FP technique (i.e., within its two-dimensional Fourier space comprised of coordinates $(k_x, k_y)$). However, FPT reconstruction may successfully converge with less than 60% overlap within its three-dimensional Fourier space (i.e., within the Fourier space comprised of coordinates $(k_x, k_y, k_z)$). In another example, the overlap is in a range from 2% to 99.5%. In another example, the overlap is in the range of 65% to 75%. In another example, the overlap is greater than 65%.

If the solution is determined to have converged to the estimate $\tilde{V} (k_x, k_y, k_z)$ in the Fourier domain at sub-operation 649, the processor takes a three-dimensional inverse Fourier transform following Eqn. 4 of the estimate $\tilde{V} (k_x, k_y, k_z)$ to recover the three-dimensional index of refraction profile of the sample, V(x, y, z). Then, the FPT imaging method returns to optional display operation 650 or ends the imaging run of the FPT imaging method according to FIG. 6A.

Figure 7:
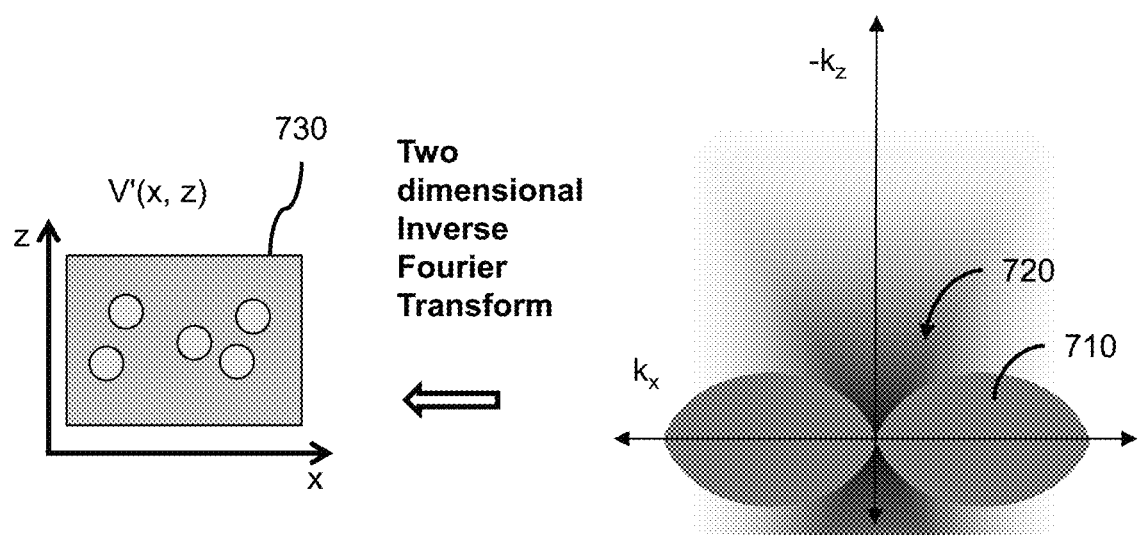
FIG. 7 is a diagram depicting a bandpass region of the potential spectrum values recovered in an exemplary FPT reconstruction process, according to an embodiment.

According to aspects, after the FPT reconstruction process converges, potential spectrum values within a fixed bandpass region are estimated. In these cases, the FPT imaging method recovers estimates of the values of the potential spectrum from a small region of the entire three-dimensional potential sample spectrum. FIG. 7 is a diagram depicting a two-dimensional bandpass region 710 of the potential spectrum, with values $\tilde{V} (k_x, k_z)$ 720, that are recovered in an exemplary FPT reconstruction process, according to an embodiment. The two-dimensional inverse Fourier transform of the potential spectrum that contains the bandpass region 710 creates an estimate of the sample's two-dimensional index of refraction, contained in V'(x, z) 730, which is the recovered approximate scattering potential. In practice, the potential spectrum is a three-dimensional function, $\tilde{V} (k_x, k_y, k_z)$, the bandpass volume it contains is a small region of the entire 3D potential spectrum space, and a three-dimensional inverse Fourier transform of $\tilde{V} (k_x, k_y, k_z)$ yields an estimate of the sample's three-dimensional index of refraction contained in V'(x, y, z).

Figure 8:
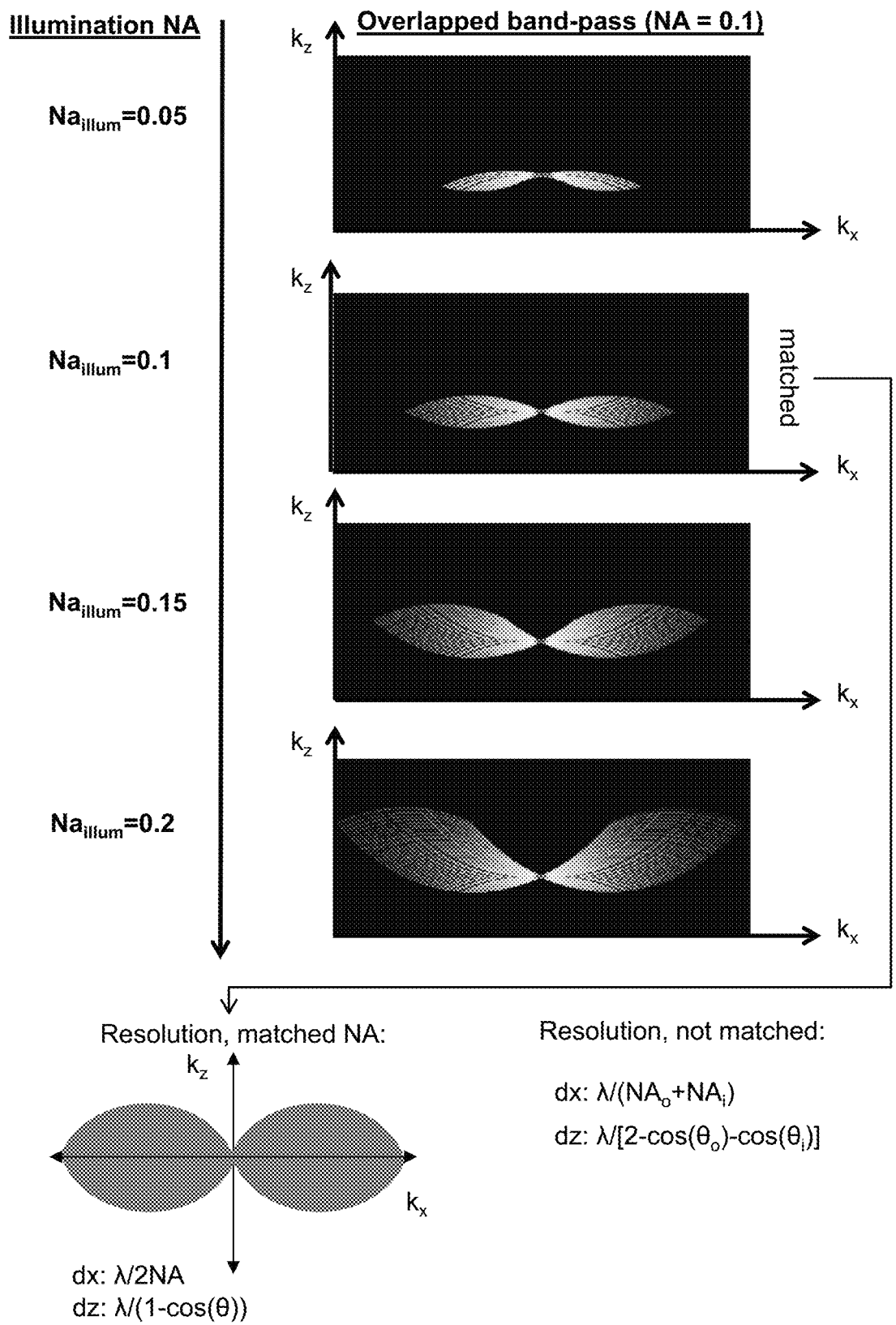
FIG. 8 depicts various FPT bandpass shapes that result from different illumination NAs and for microscope objective lens NA, according to embodiments.

Different FPT system configurations will create differently shaped bandpass functions. For example, different combinations of microscope objective lens NA and illumination NA of an FPT system will create differently shaped bandpass functions. FIG. 8 depicts four plots in $k_x$ and $k_z$ of FPT bandpass shapes that result from the variable illumination source having different illumination NAs ($NA_{illum}$), according to embodiments. The four plots have overlapped bandpass shapes for the three different illumination NAs, $NA_{illum}=0.05$, $NA_{illum}=0.1$, $NA_{illum}=0.15$, and $NA_{illum}=0.2$. Illumination NA or $NA_{illum}$ refers to the sine of the maximum angle of illumination from the LED array (i.e., the angle between the LED that is maximally displaced from the optical axis, and the optical axis. All plots in FIG. 8 assume the same objective lens $NA_o=0.1$. At the bottom plot of FIG. 8 is the bandpass that is formed when the illumination NA and objective lens NA are matched (that is, $NA_{illum}=NA_o=0.1$), which leads to a shape that is symmetric about the $k_x$ axis. When the two NAs are matched, the expected resolution along the x and y axis is given by the well-known equation λ/2NA, and the expected z resolution is given by λ/(1−asin(NA)). When the NAs are not matched, the expected resolutions take a slightly more complicated form (see FIG. 8, lower right).

In some aspects, the FPT imaging methods includes additional operations to improve the above-mentioned limited bandpass restrictions. For example, the "missing cone problem" of conventional tomography can be applied. The "missing cone problem" and operations to overcome it are discussed for example in K. C. Tam and V. Perezmendez, "Tomographical imaging with limited-angle input," J. Opt. Soc. Am. 21 (1981), as well as B. P. Medo, W. R. Brody, M. Nassi, and A. Macovski, "Iterative convolution backprojection algorithm for image-reconstruction from limited data," J. Opt. Soc. Am. 73 (1983), which are hereby incorporated by reference for this discussion. Similar operations may be used in conjunction with the FPT imaging method to improve the quality of the 3D reconstruction.

Figure 9A:
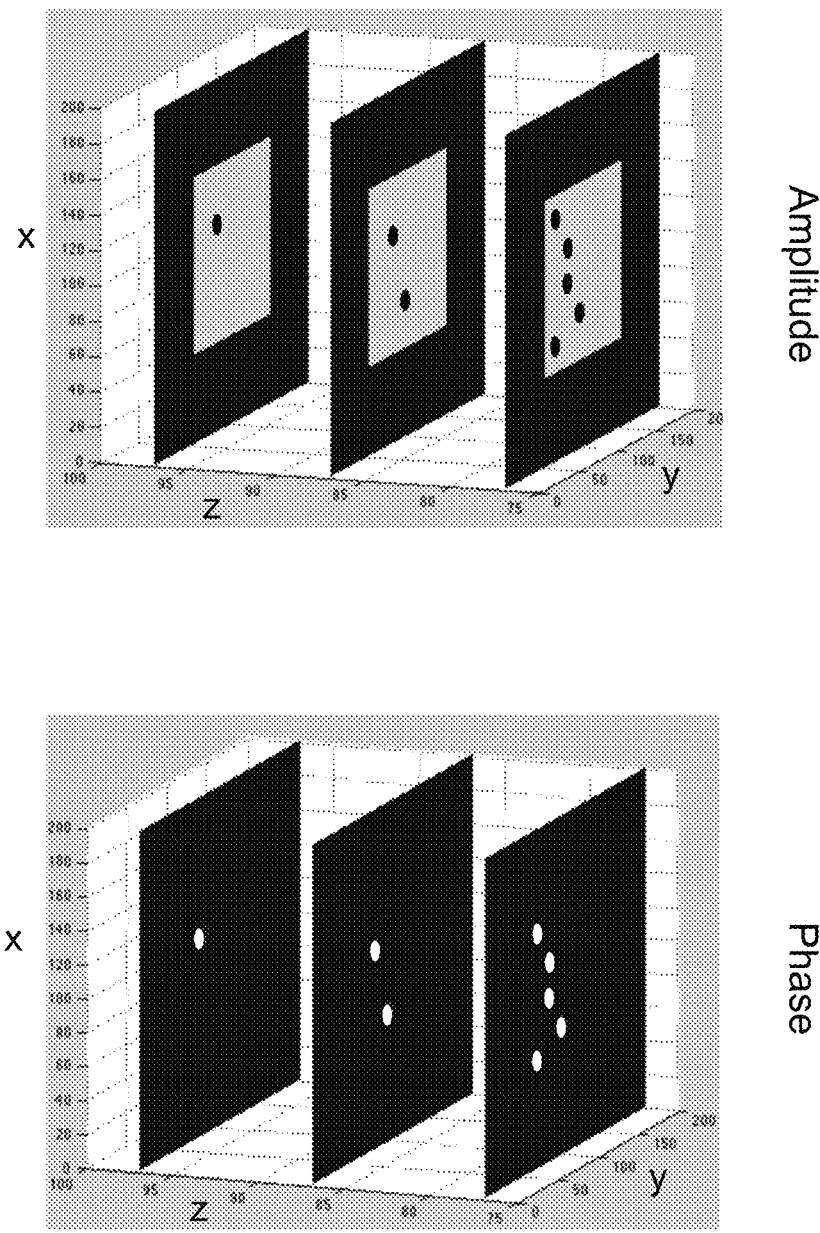
FIG. 9A is an illustration of simulated results of using the FPT technique to recover both amplitude and phase data of a thick sample having eight microspheres, according to embodiments.

FIG. 9A is an illustration of simulated results of using the FPT technique to recover both amplitude and phase data of a three-dimensional sample having eight microspheres, according to embodiments. For these simulated results, the FPT system has an optical system with a microscope objective lens with an NA=0.4 and the pixel size is 3 μm, the illumination wavelength λ is 0.5 μm and the illumination NA is 0.3. The FPT imaging method captured $45^2$ images and was repeated for k=9 times. The sample being imaged included eight (8) microspheres (index of refraction=1.6) in a surrounding oil medium (index of refraction=1.5). The microsphere was 30 μm in diameter. The sample is 300× 300×300 μm.

Figure 9B:
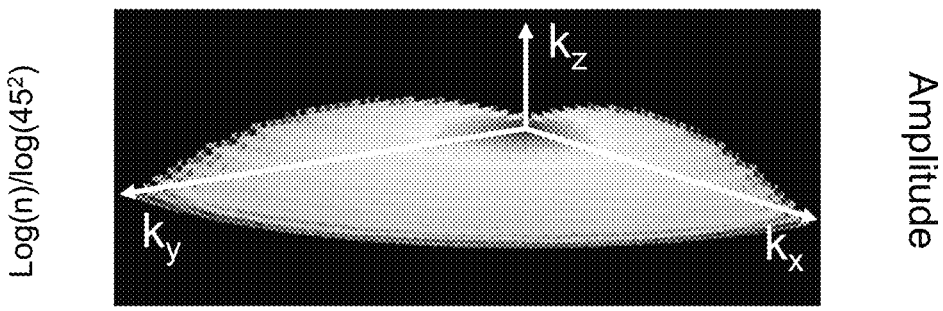
FIG. 9B is an illustration of the number of overlaps in the spherical cap regions updated in the Fourier domain used to recover amplitude and phase data in the simulated results described with respect to FIG. 9A.
Figure 9B:
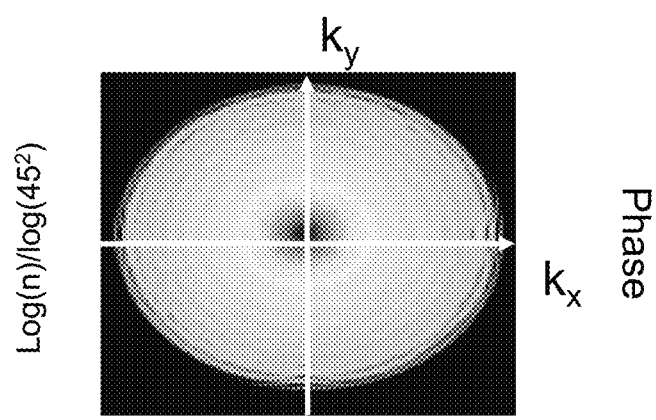

FIG. 9B is an illustration of the number of overlaps in the spherical cap regions updated in the Fourier domain used to recover amplitude and phase data in the simulated results described with respect to FIG. 9A.

Figure 9C:
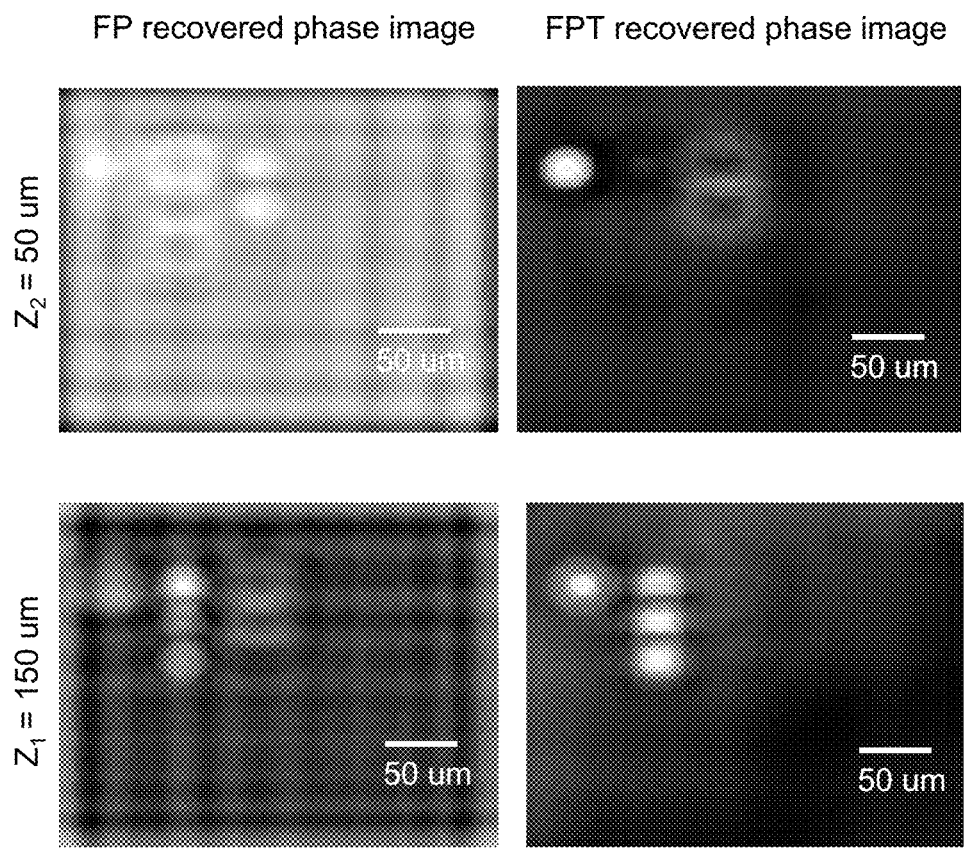
FIG. 9C is an illustration of phase images of the eight microspheres at two different depths recovered using a conventional FP technique and recovered using an FPT technique described with respect to FIG. 9A, according to an embodiment.

FIG. 9C is an illustration of phase images of the eight microspheres at two different depths ($z_1$=50 μm and $z_2$=150 μm) in the thick sample that were recovered using a conventional FP technique and recovered using an FPT technique described with respect to FIG. 9A, according to an embodiment. As shown, the FPT imaging method recovered much sharper three-dimensional results than the conventional FP imaging method. For a fair comparison, the FP imaging method was used to first recover the two-dimensional field emerging from the surface of the thick sample. Then, this field was digitally propagated (that is, refocused to different axial planes) to generate the phase images at the different depths.

Figure 10:
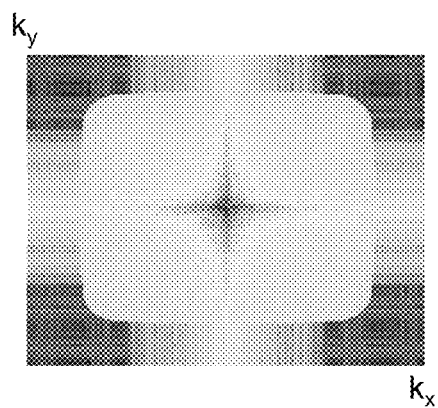
FIG. 10 is an illustration of the high discretization along k that results from the three dimensional FPT imaging method, according to embodiments.
Figure 10:
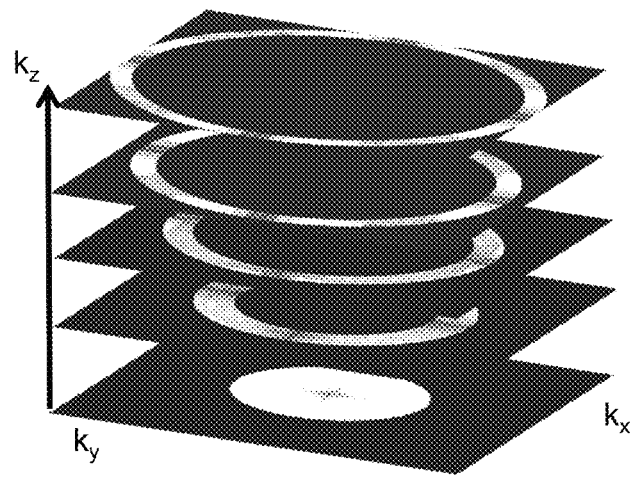

FIG. 10 is an illustration of the high discretization along $k_z$ that results from the three dimensional FPT imaging method, according to embodiments, as compared with the two dimensional FP imaging method. Here, the top drawing shows the recovered 2D spectrum for FP, and at bottom show one discretized bowl that is used to update the entire 3D scattering potential for FPT. Here, this bowl is discretized into 5 voxel slices along k, The particular values of discretization along all three dimensions in k-space are available via the equations in FIG. 8. Note that a higher value of discretization along $k_z$ encourages more overlap, while a smaller value will lead to less overlap, but a larger number of total resolved slices along the z-axis.

IV. Subsystems

Figure 11:
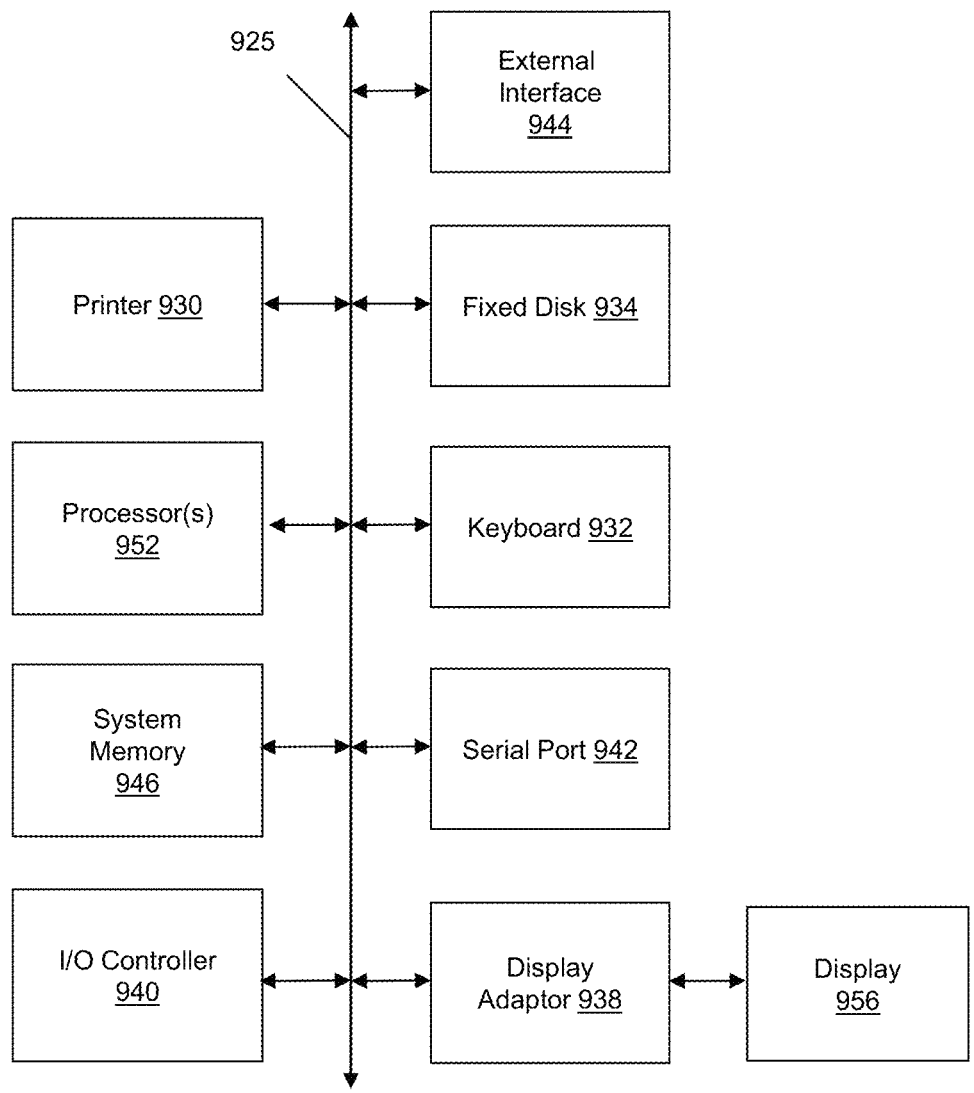
FIG. 11 is a block diagram of one or more subsystems that may be present in certain FPT systems, according to embodiments.

FIG. 11 is a block diagram of one or more subsystems that may be present in certain FPT systems, according to embodiments. A processor may be a part of the image sensor in some cases. The various components previously described in Figures may operate using one or more of these subsystems to facilitate the functions described herein. Any of the components in the Figures may use one or more of these subsystems to facilitate functions described herein. Examples of such subsystems are shown in a FIG. 11.

The subsystems shown in FIG. 11 are interconnected via a system bus 925. Additional subsystems such as a printer 930, keyboard 932, fixed disk 934 (or other memory comprising computer readable media), display 956, which is coupled to display adapter 938, and others are shown. Peripherals and input/output (I/O) devices, which couple to I/O controller 940, can be connected by any number of means known in the art, such as serial port 942. For example, serial port 942 or external interface 944 can be used to connect components of a computing device to a wide area network such as the Internet, a mouse input device, or a scanner. The interconnection via system bus 925 allows one or more processors to communicate with each subsystem and to control the execution of instructions from system memory 946 or the fixed disk 934, as well as the exchange of information between subsystems. The system memory 946 and/or the fixed disk 934 may embody the CRM 420 in some cases. Any of these elements may be present in the previously described features.

In some embodiments, an output device such as the printer 930 or display 956 or display 430 of the FPT system can output various forms of data. For example, the FPT system can output images or other data associated with analyses performed by the FPT system.

Modifications, additions, or omissions may be made to any of the above-described embodiments without departing from the scope of the disclosure. Any of the embodiments described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A Fourier ptychographic tomographic system, comprising:
an array of light elements, each light element having at least one light source, wherein the array of light elements is configured to provide illumination that is approximately plane wave illumination at each one of a plurality of illumination angles, provided sequentially over time, to a stationary, thick sample being imaged;
an optical system configured to collect light passing through the thick sample from the array of light elements and focus the collected light;
an image sensor configured to receive the focused light from the optical system and acquire a sequence of uniquely-illuminated intensity measurements, each associated with one of the plurality of illumination angles, wherein the image sensor is configured to acquire each of the uniquely-illuminated intensity measurements while the array of light elements provides plane wave illumination at one of the plurality of illumination angles during operation, wherein the array of light elements is configured to activate only one light element during each exposure time to provide the illumination that is approximately plane wave illumination at one illumination angle during acquisition of each uniquely-illuminated intensity measurement; and a processor configured to execute instructions to construct three-dimensional tomographic data of index of refraction of the stationary, thick sample, by:

(i) using a current three-dimensional sample solution to generate data in each of a plurality of spherical cap regions in three-dimensional Fourier space;

(ii) inverse Fourier transforming data in the three-dimensional spherical cap region to generate image data, while leaving phase unchanged replacing magnitudes of the image data with measured magnitudes from a uniquely-illuminated intensity measurement associated with an illumination angle corresponding to a location of the three-dimensional spherical cap region in three-dimensional Fourier space to produce updated image data, Fourier transforming the updated image data, and inserting the Fourier-transformed updated image data into the three-dimensional spherical cap region;

(iii) repeating operations in (ii) for each of the plurality of spherical cap regions in three-dimension Fourier space to determine an updated three-dimensional sample solution; and (iv) repeating operations in (iii) until a comparison of the updated three-dimensional sample solution and the current three-dimensional sample solution is less than a predefined percentage; and (v) inverse Fourier transforming the updated three-dimensional sample spectrum to determine the three-dimensional tomographic data of index of refraction of the stationary, thick sample.

2. The Fourier ptychographic tomographic system of claim 1, wherein two or more adjacent spherical cap regions of the plurality of three-dimensional spherical cap regions have at least partially overlapping surface areas in three-dimensional Fourier space.

3. The Fourier ptychographic tomographic system of claim 2, wherein the at least partially overlapping surface areas overlap by at least 70%.

4. The Fourier ptychographic tomographic system of claim 2, wherein the at least partially overlapping surface areas overlap by at least 80%.

5. The Fourier ptychographic tomographic system of claim 1, wherein the array of light elements is a light emitting diode (LED) matrix.

6. The Fourier ptychographic tomographic system of claim 5, wherein the LED matrix is a two-dimensional matrix.

7. The Fourier ptychographic tomographic system of claim 5, wherein the LED matrix comprise a plurality of concentric rings, each concentric ring having two or more LEDs.

8. The Fourier ptychographic tomographic system of claim 1, wherein the optical system is comprises at least one objective lens.

9. The Fourier ptychographic tomographic system of claim 1, further comprising a display for displaying an image of the sample determined using the three-dimensional tomographic data.

10. A Fourier ptychographic tomographic imaging method, comprising:

receiving a plurality of uniquely-illuminated intensity measurements from an image sensor, the plurality of uniquely-illuminated intensity measurements based on light passing through a stationary, thick sample from an array of light elements, each light element having at least one light source, wherein each of the uniquely-illuminated intensity measurements is acquired by the image sensor while the array of light elements provides illumination that is approximately plane wave illumination to the stationary, thick sample at one of a plurality of illumination angles, wherein only one light element of the array is configured to be activated at each image acquisition time in order to provide the illumination that is approximately plane wave illumination at one of the illumination angles; and constructing three-dimensional tomographic data of index of refraction of the thick sample by:

(i) using a current three-dimensional sample solution to generate data in each of a plurality of spherical cap regions in three-dimensional Fourier space;

(ii) inverse Fourier transforming data in the three-dimensional spherical cap region to generate image data, while leaving phase unchanged replacing magnitudes of the image data with measured magnitudes from a uniquely-illuminated intensity measurement associated with an illumination angle corresponding to a location of the three-dimensional spherical cap region in three-dimensional Fourier space to produce updated image data, Fourier transforming the updated image data, and inserting the Fourier-transformed updated image data into the three-dimensional spherical cap region;

(iii) repeating operations in (ii) for each of the plurality of spherical cap regions in three-dimension Fourier space to determine an updated three-dimensional sample solution; and (iv) repeating operations in (iii) until a comparison of the updated three-dimensional sample solution and the current three-dimensional sample solution is less than a predefined percentage; and (v) inverse Fourier transforming the updated three-dimensional sample spectrum to determine the three-dimensional tomographic data of index of refraction data of the thick sample.

11. The Fourier ptychographic tomographic imaging method of claim 10, wherein two or more adjacent spherical cap regions of the plurality of three-dimensional cap regions have at least partially overlapping surface areas in three-dimensional Fourier space.

12. The Fourier ptychographic tomographic imaging method of claim 11, further comprising determining the current three-dimensional sample solution as an initialized three-dimensional sample solution or a previous three-dimensional sample solution of another iteration.

13. The Fourier ptychographic tomographic imaging method of claim 11, wherein the updated image data is updated in (ii) along a circular path in the three-dimensional sample solution.

14. The Fourier ptychographic tomographic method of claim 11, wherein the overlapping surface areas overlap by at least 70%.

15. The Fourier ptychographic tomographic method of claim 11, wherein the overlapping surface areas overlap by at least 80%.

16. The Fourier ptychographic tomographic system of claim 1, wherein constructing the three-dimensional tomographic data comprises recovering phase data from the uniquely-illuminated intensity measurements.

17. The Fourier ptychographic tomographic imaging method of claim 11, wherein constructing the three-dimensional tomographic data of the thick sample comprises recovering phase data from the uniquely-illuminated intensity measurements.

18. The Fourier ptychographic tomographic system of claim 1, wherein each uniquely-illuminated intensity measurement corresponds to a different spherical cap region in three-dimensional Fourier space.

19. The Fourier ptychographic tomographic system of claim 1, wherein each uniquely-illuminated intensity measurement corresponds to a different spherical cap region in three-dimensional Fourier space.

* * * * *